United States Patent [19]
Goto

[11] Patent Number: 5,898,659
[45] Date of Patent: Apr. 27, 1999

[54] DISK REPRODUCING APPARATUS AND COMPATIBLE CARTRIDGE USED WITH THE SAME

[75] Inventor: Yoshikazu Goto, Hirakata, Japan

[73] Assignee: Matsushita Electric Industrial Co., Ltd., Osaka-Fu, Japan

[21] Appl. No.: 08/764,544

[22] Filed: Dec. 12, 1996

[30] Foreign Application Priority Data

Dec. 19, 1995 [JP] Japan .................................. 7-330830

[51] Int. Cl.⁶ .............................. G11B 33/02; G11B 7/26
[52] U.S. Cl. .......................................... 369/77.2; 369/291
[58] Field of Search ................................ 369/75.1, 75.2, 369/77.1, 77.2, 272, 273, 289, 291, 292; 360/133

[56] References Cited

U.S. PATENT DOCUMENTS

| | | | |
|---|---|---|---|
| 5,063,558 | 11/1991 | Takahashi | 369/291 |
| 5,166,922 | 11/1992 | Akiyama et al. | 369/289 |
| 5,515,358 | 5/1996 | Goto | 369/291 |
| 5,570,342 | 10/1996 | Kosaka | 369/291 |
| 5,577,014 | 11/1996 | Kawamura | 369/77.2 |

Primary Examiner—Stuart S. Levy
Assistant Examiner—Angel Castro
Attorney, Agent, or Firm—Panitch Schwarze Jacobs & Nadel, P.C.

[57] ABSTRACT

A disk reproducing apparatus capable of loading a compatible cartridge and MO cartridge designed to different specifications comprised a cartridge holder unit having a first shutter opener for opening and closing a shutter on the first cartridge and a second shutter opener for opening and closing a shutter on the second cartridge, the second shutter opener being moved outside or inside the cartridge insertion path depending on the cartridge inserted, and a disk motor base unit having first and second reference posts for adjusting the respective disk mounting distances of the first and second cartridges

1 Claim, 17 Drawing Sheets

DISK REPRODUCING APPARATUS AND COMPATIBLE CARTRIDGE USED WITH THE SAME

BACKGROUND OF THE INVENTION

1. Field of the Invention

The present invention relates to a disk reproducing apparatus capable of loading two different kinds of cartridges designed to different specifications, and used for an information storage device such as a data file storage device or an image file storage device, and also relates to a compatible cartridge used with the same apparatus.

2. Description of the Related Art

Write-once and rewritable optical disks are provided, each permanently encased in a cartridge to protect the optical disk from dust and other foreign particles. A prior known cartridge will be described with reference to FIGS. 15 and 16.

FIG. 15 shows an example of a conventional, single-sided cartridge. FIG. 15 is a perspective view showing a cartridge 101 (hereinafter referred to as the MO cartridge), with its front surface facing up, that conforms to international standards defining a 90-mm magneto-optical disk. FIG. 16 is a perspective view of the same MO cartridge 101 with its back surface facing up.

The MO cartridge 101 consists primarily of a case body 102 encasing a single-sided 90-mm magneto-optical disk with a substrate thickness of 1.2 mm (hereinafter referred to as the MO disk), and a U-shaped shutter 104 fixed to a slider 103 slidably mounted to the case body 102.

The outer dimensions of the MO cartridge 101 are 90 mm in length, 94 mm in depth, and 6 mm in height. The front surface of the case body 102 has a first opening 105 through which a bias magnet is inserted and positioned inside the case body 102 during recording or reproducing. On the back surface of the case body 102, there is formed a second opening 106, through which a disk motor and an optical pickup are inserted and positioned inside the case body 102. On the back surface, there are formed positioning holes 107 and reference faces 108 used to hold the MO cartridge 101 in position.

In both side faces of the case body 102 are formed slots 109 for an autochanger and semi-circular recesses 110 for auto loading. A corner notch 111 is formed on one corner of the inserting side of the case body 102 to prevent the MO cartridge 101 from being inserted incorrectly.

The shutter 104, constructed to slide over the outer surfaces of the case body 102, is urged by a torsion spring (not shown) installed inside the case body 102 in a direction that closes the first opening 105 and second opening 106. The back end of the U-shaped shutter 104 is held by a shutter holding plate 112 so as to be guided therealong in sliding fashion Next, a prior art loading mechanism designed to accommodate the above-described MO cartridge 101 will be described with reference to FIG. 17.

FIG. 17 is a perspective view showing the prior art MO cartridge loading mechanism. In FIG. 17, arrow Y indicates the direction in which the MO cartridge 101 is inserted.

A cartridge holder 121 for holding the MO cartridge 101 in position is shaped in the form of a tray with both sides thereof bent as shown. A support shaft 122 is formed in protruding fashion on the right rear corner (the uppermost portion in FIG. 17) of the cartridge holder 121. On this support shaft 122 there is mounted a shutter opener 123 having a shutter opener pin 123a at its end. The shutter opener 123 is pivotably supported on the support shaft 122 and is urged in the direction of arrow X by a torsion spring 124. On the left rear corner of the cartridge holder 121, a pawl 125 is formed in an inwardly protruding fashion for preventing the MO cartridge 101 from being inserted incorrectly.

Next, the loading operation of the MO cartridge 101 will be described.

When the MO cartridge 101, with its front surface facing up, is inserted into the cartridge holder 121 of FIG. 17 in the direction of the arrow Y, the shutter opener pin 123a on the shutter opener 123 comes into contact with the rightmost end of the slider 103 on the MO cartridge 101. As the MO cartridge 101 is further inserted, the inserting force causes the shutter opener pin 123a to push the rightmost end of the slider 103, thus causing the slider 103 to slide along the case body 2. By moving the slider 103 against the force of the torsion spring 124 in this way, the shutter 104 is moved in the direction that opens the first opening 105 and second opening 106.

When the MO cartridge 101 is further inserted into the cartridge holder 121, the first opening 105 and second opening 106 become completely exposed, and the shutter opening operation is thus completed.

When the shutter opening operation is completed, the MO cartridge 101 is positioned with its notch 111 facing the pawl 125 of the cartridge holder 121. The pawl 125, however, is not in contact with the notch 111, and the MO cartridge 101 can thus be inserted as far as to the prescribed position.

After the shutter opening operation is completed, positioning pins (not shown) provided inside the apparatus are inserted in the positioning holes 107 formed in the inserted MO cartridge 101. At the same time, reference posts (not shown) provided inside the apparatus abut against the reference faces 108 formed on the case body 102, thus holding the inserted MO cartridge 101 in position. Also at this time, the clamping face of the MO disk inside the MO cartridge 101 is mounted on the turn table of the disk motor, and the loading operation of the MO cartridge 101 is thus completed.

Disk mounting distance (hereinafter referred to as L1), which is the distance from the reference faces 108 on the case body 102 of the MO cartridge 101 to the clamping face of the MO disk, is specified as 2.4 mm by the standard defining the MO cartridge 101.

Next, an operation will be described when the MO cartridge 101 is inserted upside down or backwards into the cartridge holder 121. When the MO cartridge 101 is inserted in the cartridge holder 121 in such an abnormal manner, the shutter 104 cannot be opened by the shutter opener pin 123a because the shutter opener pin 123a does not come into contact with the rightmost end of the slider 103 on the MO cartridge 101.

Furthermore, since a corner other than the corner notch 111 of the MO cartridge 101 strikes against the incorrect insertion prevention pawl 125 in the cartridge holder 121, the MO cartridge 101 cannot be inserted as far as to the correct position. Accordingly, the positioning pins inside the apparatus do not engage with the positioning holes 107.

In this way, when the MO cartridge 101 is incorrectly inserted, the shutter 104 is not opened, and the MO cartridge 101 cannot be loaded with its shutter 104 prevented from being opened.

With increasing demand for higher-density of recording and thinner optical disks in recent years, a double-sided disk formed from two disk substrates each with 0.6 mm thickness laminated together has been developed. A double-sided cartridge for housing such a double-sided disk is disclosed, for example, in Japanese Patent Unexamined Publication No. Hei 6-267226.

Such a prior known double-sided cartridge will be referred to simply as the double-sided cartridge, as opposed to the MO cartridge. The construction of the double-sided cartridge will be described below with reference to FIG. 18, which is a perspective view showing the double-sided cartridge 131 containing therein a double-sided disk. The construction of the double-sided cartridge 131 is substantially the same both on its front and back. For simplicity, the explanation will be given using FIG. 18 that shows the double-sided cartridge 131 with its front surface facing up.

This prior art double-sided cartridge 131 consists primarily of a case body 132 and a U-shaped shutter 133 fixed to a slider (not shown) slidably supported inside the case body 132. The outer dimensions of the double-sided cartridge 131 are 90 mm in width, 94 mm in length, and 5 mm in height. The front and back surfaces of the case body 132 each have an opening through which the disk motor and optical pickup are inserted and positioned inside the case body 132. Further, on both the front and back surfaces of the case body 132, there are formed positioning holes 135 and reference faces 136 for positioning the double-sided cartridge 131 in prescribed loading position. A groove 137 is formed on each of the right and left sides of the case body 132 in the forward portion thereof as viewed in the direction of the disk insertion. A slot 138 for an autochanger is formed on each of the right and left sides of the case body 132 in the rearward portion thereof.

An opener belt 139 connected to the shutter 133 via the slider is slidably guided along one of the grooves 137 formed on both sides of the case body 132. A shutter opener hook 140 is attached to one end of the opener belt 139.

The shutter 133 is urged by a torsion spring (not shown) installed inside the case body 132 in such a direction as to open an opening 134. Both ends of the U-shaped shutter 133 are held and guided in sliding fashion between shutter holding plates 141 mounted on the outer surfaces of the case body 132.

The opening 134, positioning holes 135, and reference faces 136 formed in the case body 132 are identical in shape and position to the corresponding portions of the earlier described MO cartridge 101. However, because of the double-sided construction, the double-sided cartridge 131 does not have the corner notch 111 nor the auto loading semi-circular recesses 110 of the MO cartridge 101.

Next, a prior art loading mechanism designed to accommodate the above-described double-sided cartridge 131 will be described with reference to FIG. 19. FIG. 19 is a perspective view showing one example of a prior art double-sided cartridge loading mechanism.

A cartridge holder 151 for holding the double-sided cartridge 131 is shaped in the form of a tray by using a plate with both sides thereof bent as shown. On each side of the cartridge holder 151 is formed a shutter opener pawl 152 that can enter the groove 137 on the double-sided cartridge 131 and can engage on the opener hook 140.

Next, the operation to insert the double-sided cartridge 131 in the cartridge holder 151 will be described.

When the double-sided cartridge 131 is inserted into the cartridge holder 151, the shutter opener pawl 152 of the cartridge holder 151 enters the groove 137 of the case body 132 and engages on the shutter opener hook 140. As the double-sided cartridge 131 is further inserted into the cartridge holder 151, the shutter opener hook 140 is pressed against the shutter opener pawl 152 by the inserting force of the double-sided cartridge 131. This causes the opener belt 139 connected to the shutter opener hook 140 to move, sliding along the groove 137 against the force of the torsion spring installed inside the case body 132. As a result, the shutter 133 on the case body 132 moves in the direction that opens the opening 134.

When the double-sided cartridge 131 is still further inserted, the opening 134 is completely exposed, and the shutter opening operation is thus completed.

Upon completion of the shutter opening operation, the positioning pins provided inside the apparatus are inserted in the positioning holes 135 of the double-sided cartridge 131. At the same time, the reference posts inside the apparatus are made to abut against the reference faces 136 to hold the inserted double-cartridge 131 in position. The clamping face of the double-sided disk is then mounted on the turn table of the disk motor to complete the loading operation. In this case, the disk mounting distance (hereinafter referred to as L2), which is the distance from the reference faces 136 on the case body 132 to the clamping face of the double-sided disk, is 1.9 mm. L2 of the double-sided cartridge 131 is 0.5 mm shorter than L1 (2.4 mm) of the MO cartridge 101.

When the double-sided cartridge 131 is inserted upside down into the cartridge holder 151, the shutter opener pawl 152 formed on the opposite side engages on the shutter opener hook 140, and the same shutter opening operation as described above is performed. The shutter 133 is thus opened.

When the double-sided cartridge 131 is inserted with its rear end facing forward into the cartridge holder 151, the rear end corners of the case body 132 strike against the shutter opener pawls 152, and the double-sided cartridge 131 cannot be further inserted. Incorrect insertion of the disk is thus prevented.

As described above, the prior art loading mechanisms have been designed exclusively for either the MO cartridge or the double-sided cartridge. In the prior art, there have not been provided compatible loading mechanisms capable of loading both the MO cartridge 101 and the double-sided cartridge 131.

In recent years, in the field of optical disk technology, a demand has been increasing for compatible loading mechanisms that can load both the MO cartridge 101 and the double-sided cartridge 131.

However, there have been several problems as will be described below in the development of the compatible loading mechanism that can load both the MO cartridge 101 and the double-sided cartridge 131.

(1) The shutter opening system is different between the MO cartridge 101 and the double-sided cartridge 131. This has made it impossible to use either prior art loading mechanism as a compatible loading mechanism. More specifically, with the loading mechanism designed for the MO cartridge 101, the shutter 133 on the double-sided cartridge 131 cannot be opened. Furthermore, since the incorrect insertion prevention pawl 125 on the cartridge holder 121 strikes against a corner of the double-sided cartridge 131, the double-sided cartridge 131 cannot be inserted as far as to the prescribed position in the loading mechanism built for the MO cartridge 101.

On the other hand, with the loading mechanism designed for the double-sided cartridge 131, the shutter 104 on the MO cartridge 101 cannot be opened. Furthermore, since the shutter opener pawls 152 on the cartridge holder 151 strike against corners of the MO cartridge 101, the MO cartridge 101 cannot be inserted as far as to the prescribed position in the loading mechanism built for the double-sided cartridge 131.

(2) The thicknesses of the MO cartridge 101 and double-sided cartridge 131 are different by 1 mm. As a result, when the disk is mounted on the turn table, the disk mounting distance from the outer surface of the cartridge to the mounting surface of the disk is different by 0.5 mm between the MO cartridge 101 and the double-sided cartridge 131. This would require an adjusting mechanism to position the double-sided cartridge 131 0.5 mm higher than the MO cartridge 101, but neither the double-sided cartridge 131 nor the loading mechanism of the prior art has been equipped with such a mechanism to adjust the loading position of the inserted cartridge.

SUMMARY OF THE INVENTION

It is an object of the present invention to provide a disk reproducing apparatus capable of loading two kinds of cartridges that are different in shutter opening method and disk mounting position, and a compatible cartridge suitable for use with such a disk reproducing apparatus.

To achieve the above object, the present invention provides a disk reproducing apparatus comprising:

a cartridge holder unit for holding a first cartridge having a corner notch or a second cartridge having no corner notches when the first or the second cartridge is inserted therein, the first and second cartridges being different in method of shutter opening;

a first shutter opener unit, swingably mounted on the cartridge holder unit, for opening a shutter on the first cartridge by contacting the first cartridge when the first cartridge is inserted in the cartridge holder unit;

a second shutter opener unit, having a second shutter opener disposed on each side of the cartridge holder unit and constructed to be movable in vertical directions, for opening a shutter on the second cartridge with the second shutter opener contacting the second cartridge when the second cartridge is inserted in the cartridge holder unit; and a clutch lever unit for moving the second shutter opener outside a cartridge insertion path by contacting the corner notch of the first cartridge when the first cartridge is inserted in the cartridge holder unit.

Preferably, the clutch lever unit comprises: a clutch lever; a clutch lever pressing plate spring, having a first pressing plate spring and a second pressing plate spring, for pressing the clutch lever in two directions; a slide plate having a lift slope for lifting the second shutter opener unit upward when the clutch lever is turned in a first direction; and an inclined guide for moving the clutch lever upward when the clutch lever is turned in a second direction.

Also preferably, the second shutter opener unit is constructed with a movable plate liftably connected to the cartridge holder unit via a plate spring, and a stopper for limiting a lifting motion of the movable plate is provided on the slide plate.

The invention also provides a disk reproducing apparatus comprising: a cartridge holder unit for holding a first cartridge having a corner notch or a second cartridge having no corner notches when the first or the second cartridge is inserted therein, the first and second cartridges being different in disk mounting distance; a first shutter opener unit, swingably mounted on the cartridge holder unit, for opening a shutter on the first cartridge by contacting the first cartridge when the first cartridge is inserted in the cartridge holder unit; a second shutter opener unit, having a second shutter opener disposed on each side of the cartridge holder unit and constructed to be movable in vertical directions, for opening a shutter on the second cartridge with the second shutter opener contacting the second cartridge when the second cartridge is inserted in the cartridge holder unit; a clutch lever unit for moving the second shutter opener outside a cartridge insertion path by contacting the corner notch of the first cartridge when the first cartridge is inserted in the cartridge holder unit; and a disk motor base unit, provided with a first reference post and a second reference post having different heights, for positioning the first or the second cartridge in a prescribed position during a cartridge loading operation with the respective reference posts contacting the first or the second cartridge when the first or the second cartridge is inserted in the cartridge holder unit.

The invention also provides a compatible cartridge comprising: a case body encasing a read-only or writable disk and shaped in the form of a substantially rectangular housing, the case body having an opening formed therein; and a shutter for opening and closing the opening of the case body, and wherein: the compatible cartridge has substantially the same shape as a case body of a cartridge having an autochanger slot and an auto loading recess near each side of the case body, has a shorter disk mounting distance than the latter cartridge, and has reference faces for cartridge loading which are formed in positions corresponding to the autochanger slot and auto loading recess formed in the latter cartridge.

In the above construction, since the second shutter opener can be moved outside or inside the cartridge insertion path in the cartridge holder unit depending on the presence or absence of a corner notch on the inserted cartridge, when the cartridge having a corner notch is inserted from the correct direction, the second shutter opener is moved according to the thus inserted cartridge, so that the cartridge is allowed to be inserted as far as to the prescribed position and the shutter on the first cartridge is opened by the action of the first shutter opener. On the other hand, when the cartridge is inserted from the wrong direction, the second shutter opener does not move but stays inside the cartridge insertion path, so that the inserted cartridge strikes against the second shutter opener, preventing incorrect insertion of the cartridge. In this way, only when either of the two kinds of cartridges having different shutter opening methods is inserted correctly, reliable compatible loading operation can be performed with the cartridge inserted as far as to the prescribed position in the cartridge holder and with the shutter completely opened.

Further, when the compatible cartridge is loaded into the disk reproducing apparatus capable of interchangeably loading the cartridges having different disk mounting distances, the compatible cartridge is securely positioned in the proper disk mounting position with the reference posts provided in the disk reproducing apparatus being engaged in the plurality of reference faces formed in the case body of the compatible cartridge, thus ensuring highly reliable compatible loading operation.

While the novel features of the invention are set forth particularly in the appended claims, the invention, both as to organization and content, will be better understood and appreciated, along with other objects and features thereof, from the following detailed description taken in conjunction with the drawings.

It will be recognized that some or all of the Figures are schematic representations for purposes of illustration and do not necessarily depict the actual relative sizes or locations of the elements shown.

DESCRIPTION OF THE PREFERRED EMBODIMENTS

A preferred embodiment of the disk reproducing apparatus of the present invention and a compatible cartridge used with the same will be described below with reference to the accompanying drawings.

[CONSTRUCTION OF THE COMPATIBLE CARTRIDGE]

Figure 1:
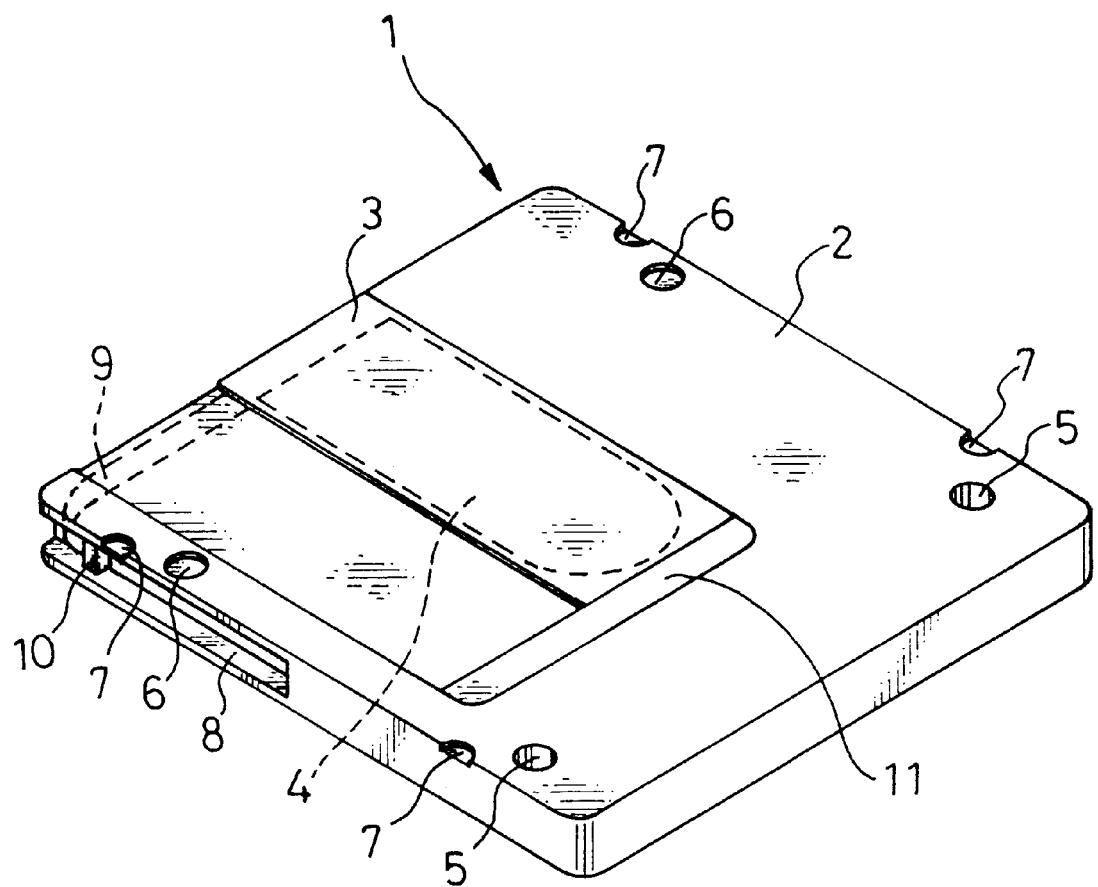
FIG. 1 is an external perspective view of a compatible cartridge according to one embodiment of the present invention.
Figure 18:
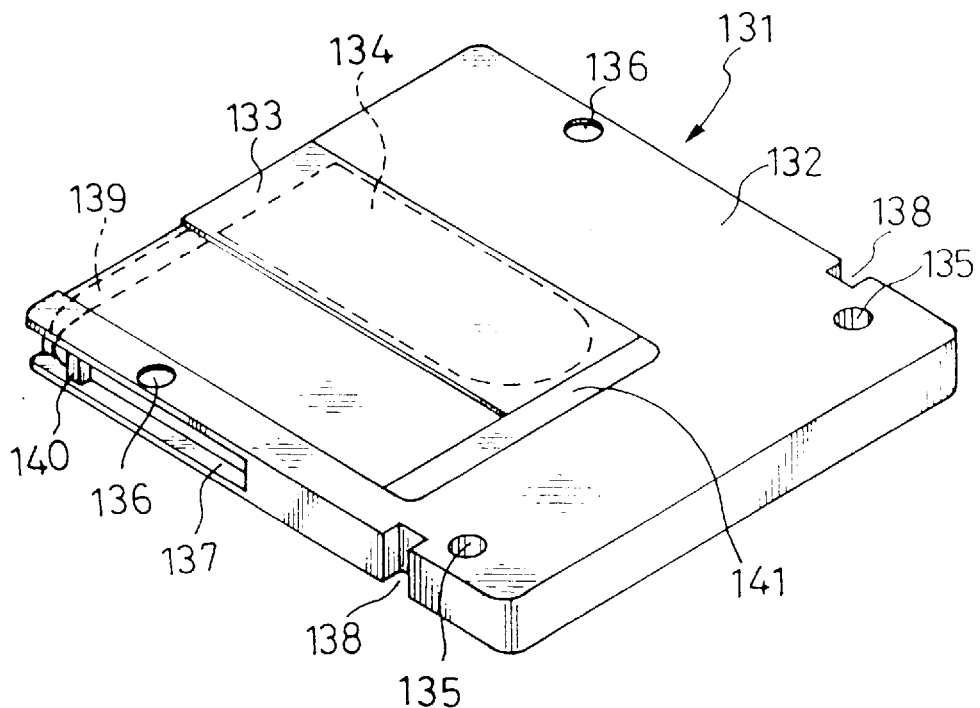
FIG. 18 is an external perspective view showing a prior art double-sided cartridge as viewed from the front.
Figure 19:
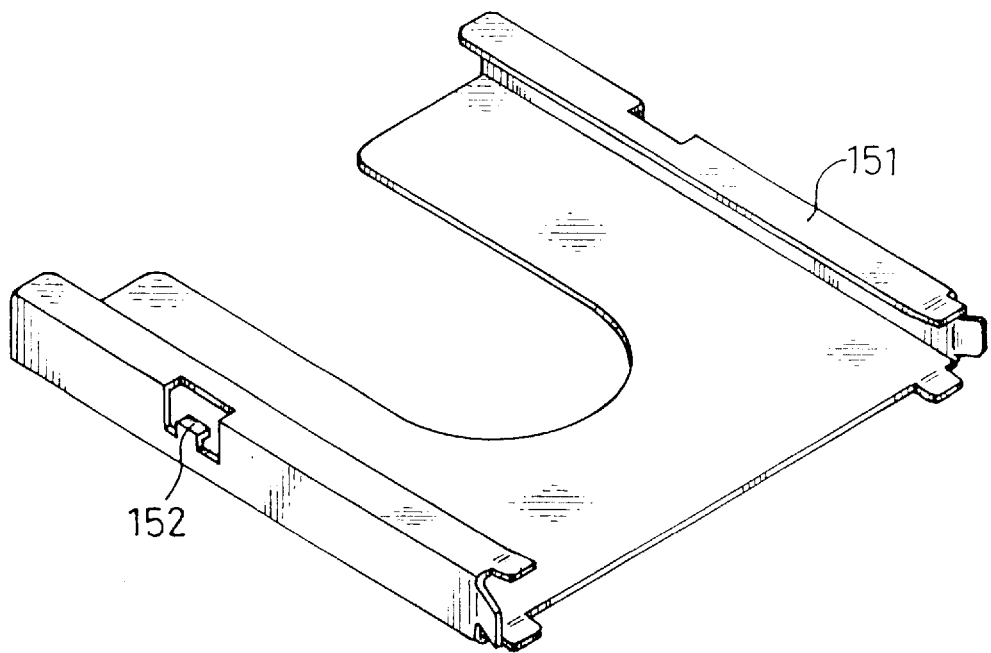
FIG. 19 is an external perspective view showing a prior art double-sided cartridge loading mechanism.

FIG. 1 is a perspective view showing one embodiment of the compatible cartridge 1 of the present invention, which is an improvement on the prior art double-sided cartridge shown in FIG. 18. The compatible cartridge 1 shown in FIG. 1 comprises a case body 2 and a U-shaped shutter 3 that slides over the outer surfaces of the case body 2, the shutter 3 being fixed to a slider (not shown) slidably supported inside the case body 2. In the front surface of the case body 2, there are formed: an opening 4 through which a disk motor and an optical pickup are inserted and positioned inside the case body 2; positioning holes 5; and first reference faces 6 that serve as reference in determining the disk mounting distance. The case body 2 also has four second reference faces 7, 7, 7, and 7 which are formed in positions corresponding to the positions of the two autochanger slots 109, 109 and the two auto loading recesses 110, 110 formed in the MO cartridge 101 previously shown in FIG. 16.

On each side of the case body 2 is formed a groove 8 extending substantially one half of the distance along the side face and opening in the direction of insertion, as shown in FIG. 1. An opener belt 9 connected to the shutter 3 via the slider is slidably guided along the groove 8. A shutter opener hook 10 is attached to one end of the opener belt 9. The shutter opener hook 10 is so constructed as to move along the groove 8 The shutter 3, mounted slidably along the outer surfaces of the case body 2 is urged by a torsion spring (not shown) installed inside the case body 2 so that the shutter 3 is moved to the position that closes the opening 4. Both ends of the U-shaped shutter 3 are held and guided in sliding fashion between shutter holding plates 11 provided on both surfaces of the case body 2.

As shown in FIG. 1, the compatible cartridge 1 of this embodiment is substantially identical in shape to the prior art double-sided cartridge 131 shown in FIG. 18; the only difference between the compatible cartridge 1 of this embodiment and the double-sided cartridge 131 of the prior art is that in the compatible cartridge 1 the autochanger slots 138 are not formed but the second reference faces 7 are formed instead. Otherwise, the compatible cartridge 1 of this embodiment is substantially identical in shape to the prior art double-sided cartridge 131 and is therefore capable of being loaded into the prior art loading mechanism as well.

Next, the construction of the cartridge loading mechanism used for the disk reproducing apparatus of this embodiment will be described with reference to FIGS. 2 to 7. In FIGS. 2 to 5, component parts, such as on-board circuits, top panel, etch, which are substantially irrelevant to the present invention, are omitted to facilitate the understanding of the cartridge loading mechanism of the disk reproducing apparatus of this embodiment.

Figure 2:
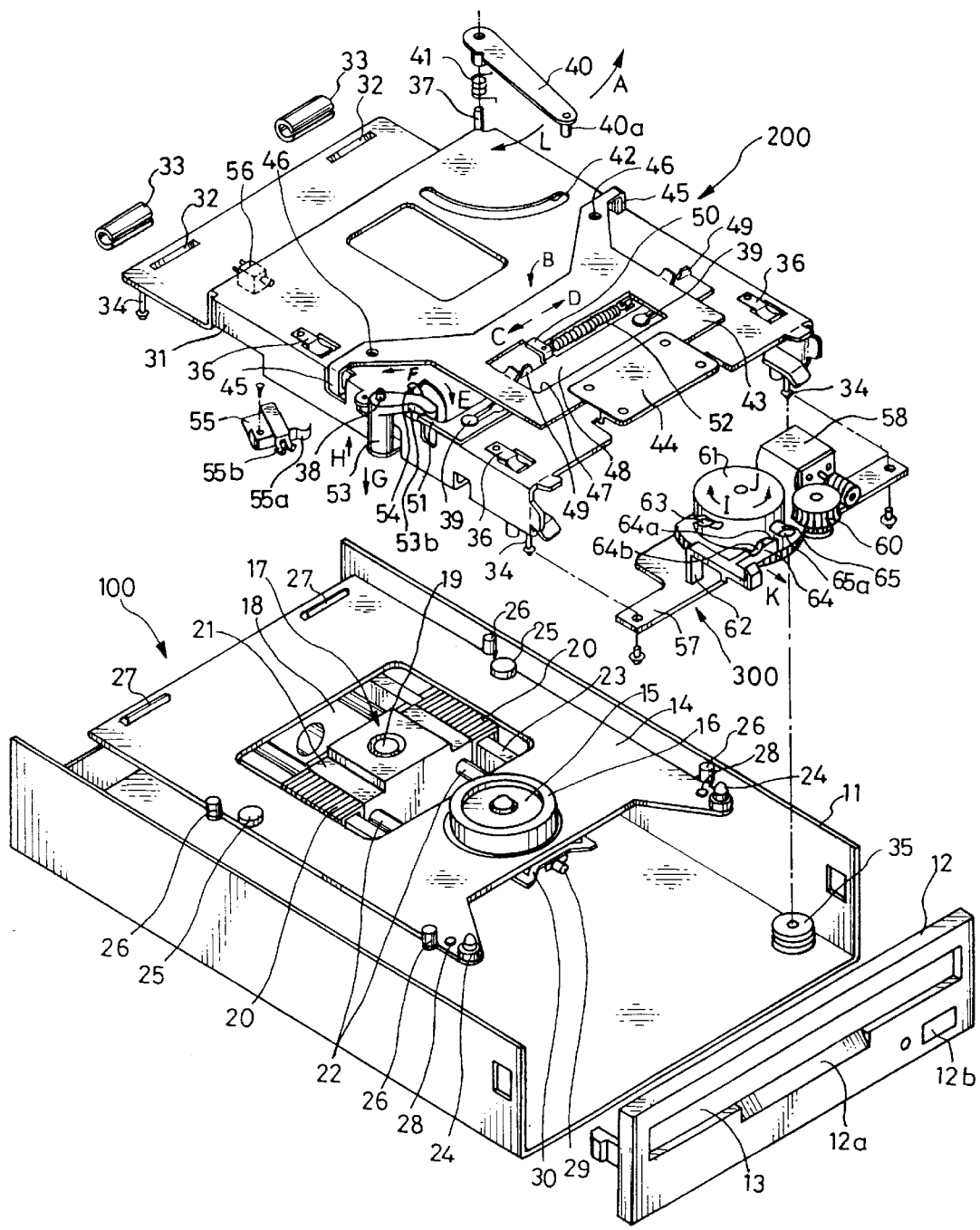
FIG. 2 is an exploded perspective view of a compatible loading apparatus mounted with a cartridge loading mechanism according to one embodiment of the present invention.
Figure 3:
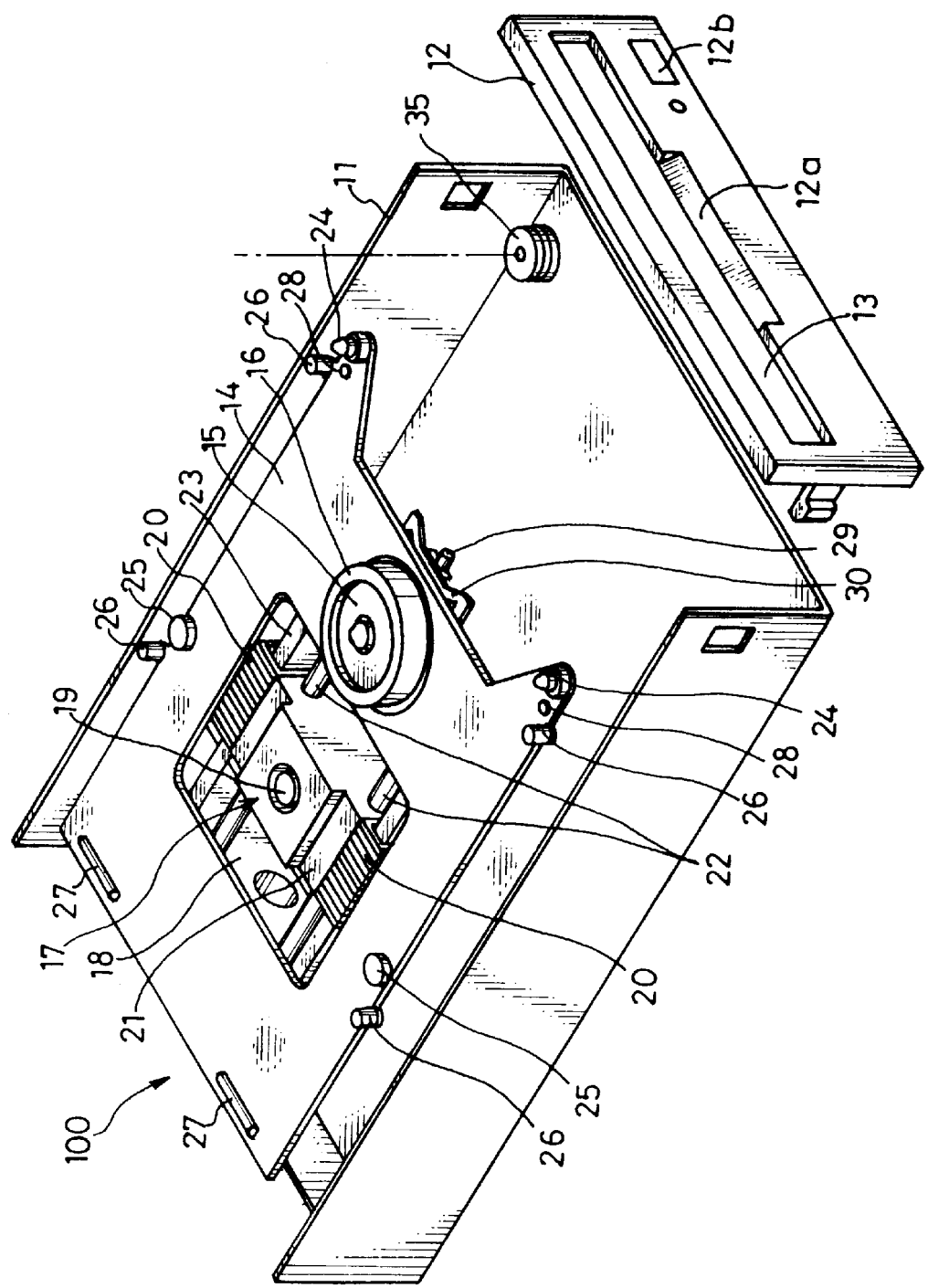
FIG. 3 is a perspective view showing a disk motor base unit in the compatible loading apparatus of FIG. 2.
Figure 4:
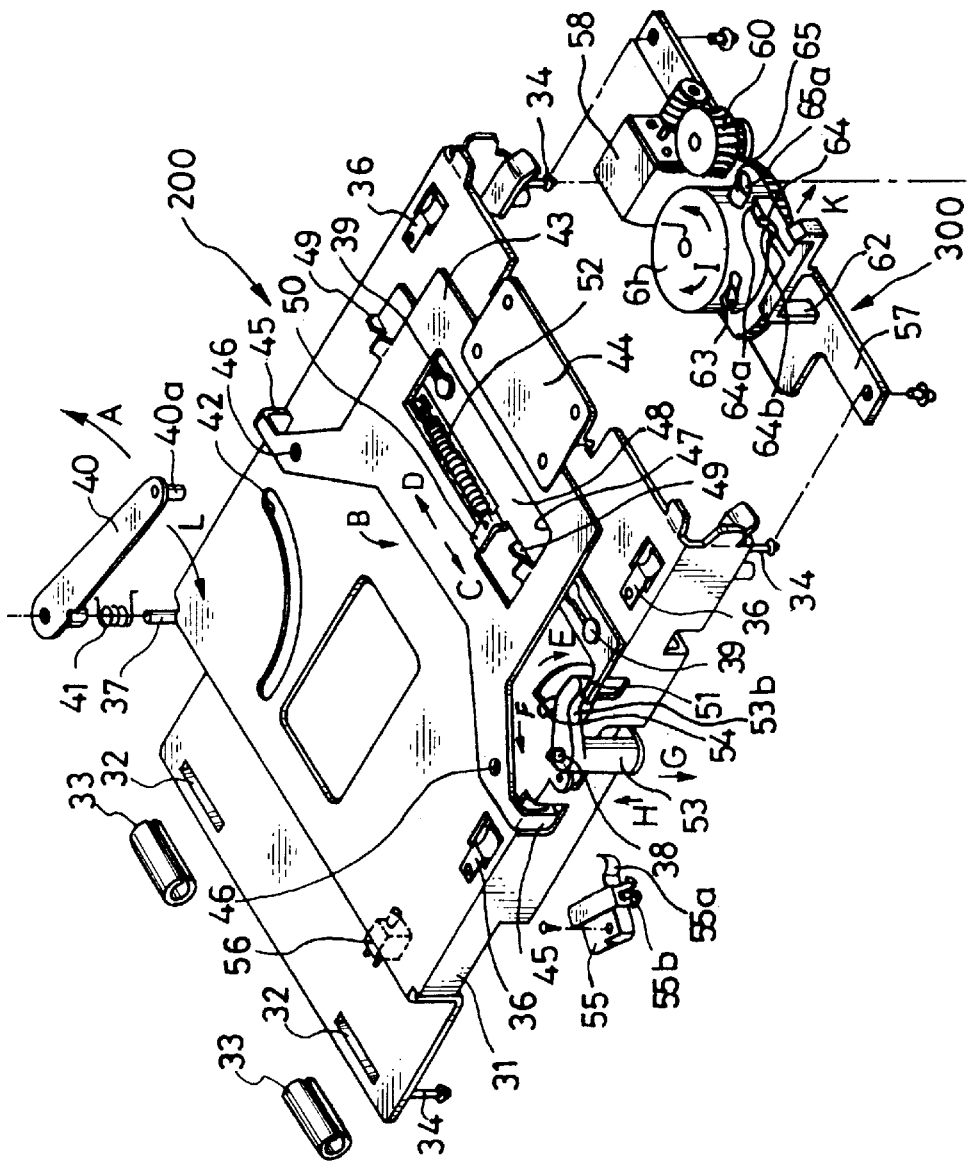
FIG. 4 is a perspective view showing a cartridge holder unit in the compatible loading apparatus of FIG. 2.
Figure 5:
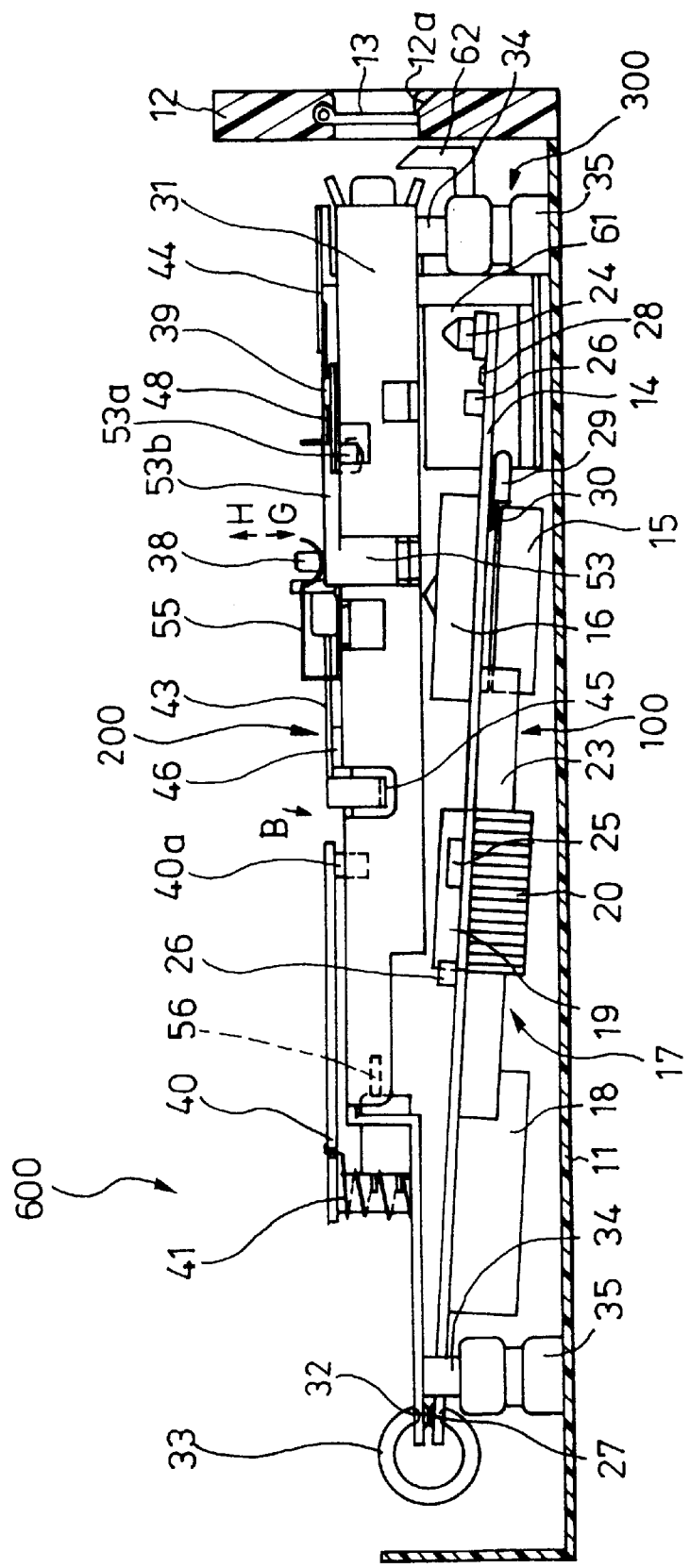
FIG. 5 is a cross-sectional view in side elevation, showing the compatible loading apparatus of FIG. 2 with no cartridge inserted therein.
Figure 6:
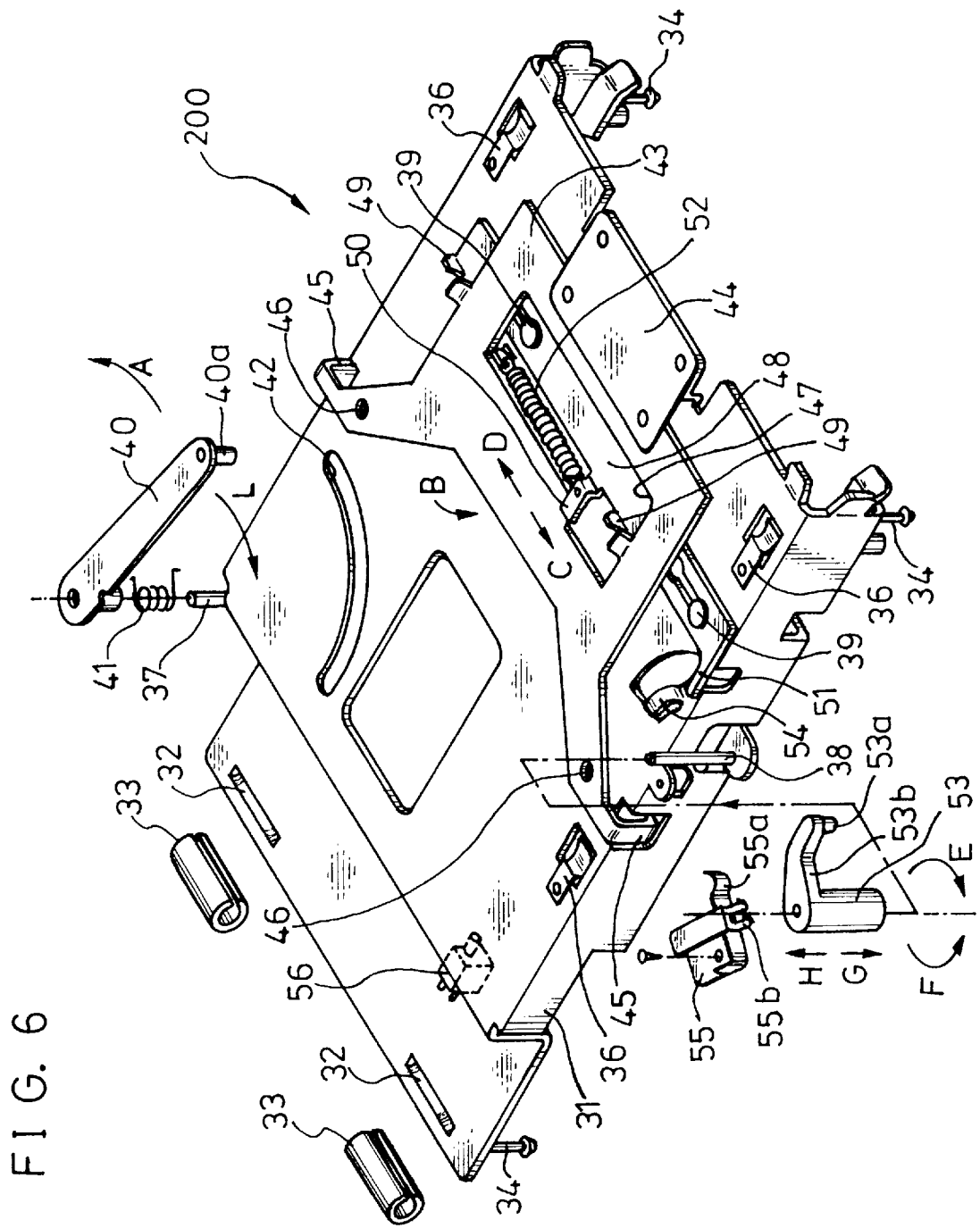
FIG. 6 is an exploded perspective view showing the cartridge holder unit in the cartridge loading mechanism of FIG. 2.
Figure 7:
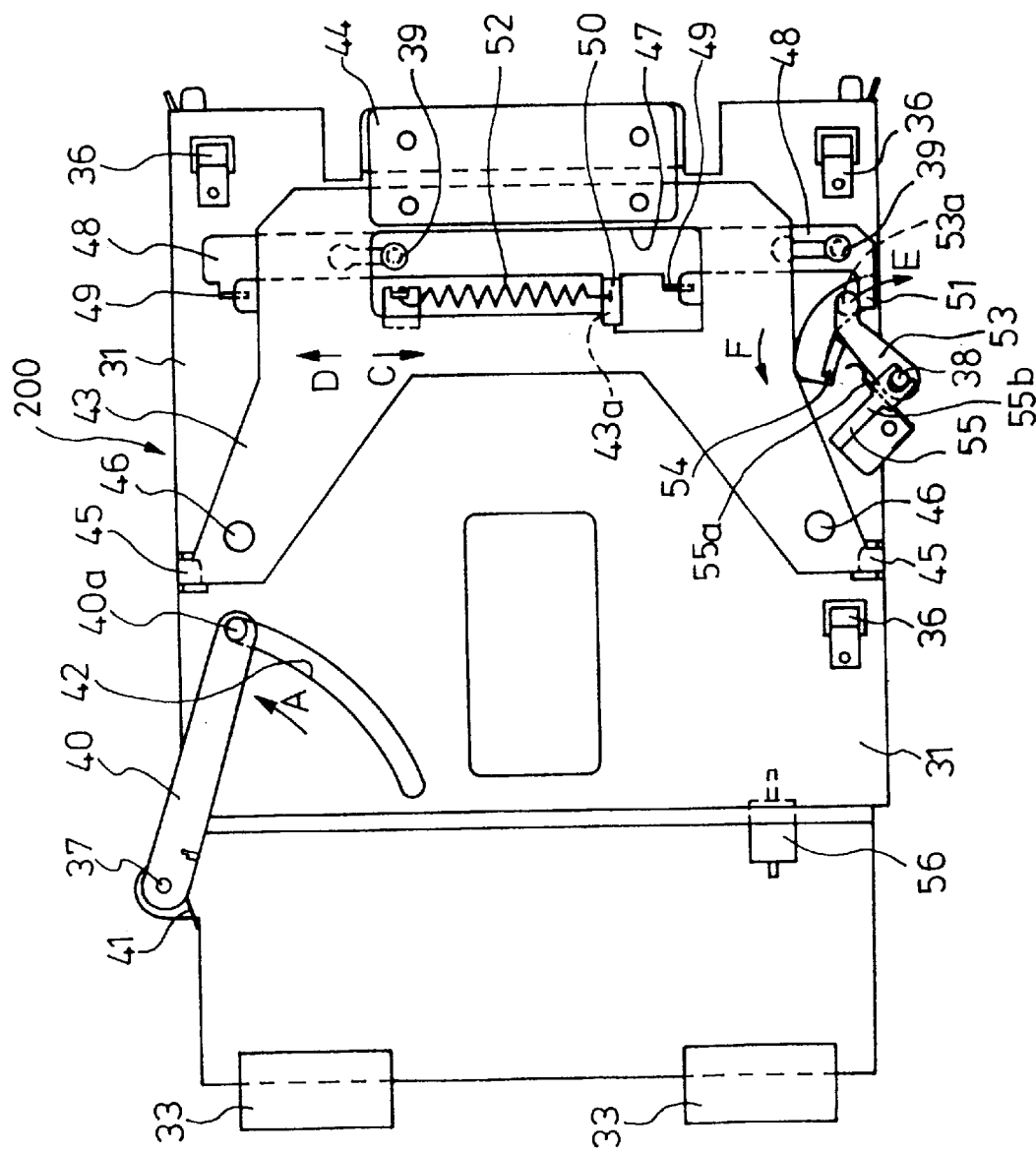
FIG. 7 is a top plan view showing the cartridge holder unit in the compatible loading apparatus of FIG. 2 with no cartridge inserted therein.

FIG. 2 is an exploded perspective view of a compatible loading apparatus mounted with the cartridge loading mechanism in the disk reproducing apparatus of this embodiment. FIG. 3 is a perspective view showing a disk motor base unit 100 in the compatible cartridge loading apparatus of FIG. 2. FIG. 4 is a perspective view showing a cartridge holder unit 200 in the compatible cartridge loading apparatus of FIG. 2. FIG. 5 is a cross-sectional view in side elevation, showing the compatible loading apparatus with no cartridge inserted therein. FIG. 6 is an exploded perspective view showing the cartridge holder unit in the compatible loading apparatus of FIG. 2. FIG. 7 is a top plan view showing the cartridge holder unit 200 of FIG. 6.

As shown in FIGS. 2 and 3, a front panel 12 having a cartridge insertion slot 12a and an eject button 12b is fitted rigidly into the front of an outer case 11. The front panel 12 also has an open/close lid 13 for opening and closing the cartridge insertion slot 12a. Inside the outer case 11 is housed a cartridge loading mechanism as the disk reproducing apparatus. The cartridge loading mechanism comprises a disk motor base unit 100 having an optical pickup 17, etc., a cartridge holder unit 200 for accommodating a cartridge, and a drive base unit 300 for driving the disk motor base unit 100.

[CONSTRUCTION OF THE DISK MOTOR BASE UNIT 100]

As shown in FIGS. 2 and 3, the disk motor base unit 100 comprises a disk motor base 14 on which a disk motor 15 is rigidly mounted. A turn table 16 is fitted rigidly onto the shaft of the disk motor 15. The optical pickup 17 comprises an optical fixture 18 consisting of a semiconductor laser, a detector, etc. fixed to the disk motor base 14, and a moving carriage 21 having an objective lens 19 and linear motor coils 20. Guide shafts 22 along which the moving carriage 21 is guided in sliding fashion are passed through the moving carriage 21 and fixed at both ends to the disk motor base 14. Linear motor magnetic circuits 23 are passed through the respective linear motor coils 20 of the moving carriage 21 and fixed at both ends to the disk motor base 14.

Further, positioning pins 24 for both the MO cartridge 101 and the compatible cartridge 1, first reference posts 25 for the MO cartridge, and second reference posts 26 for the compatible cartridge are formed in protruding fashion on the disk motor base 14. The height of the second reference posts 26 for the compatible cartridge is set 0.5 mm greater than the height of the first reference posts 25 for the MO cartridge.

As shown in FIGS. 2 and 3, grooves that serve as fulcrums 27 are formed in the rear end portion of the disk motor base 14. Further, position limiting protrusions 28 are formed near the positioning pins 24 in the front end portion of the disk motor base 14. When a cartridge is loaded, these position limiting protrusions 28 are brought into contact with the cartridge holder unit 200 to determine the position of the disk motor base 14.

A plate spring 30 is fixed to the center of the front end of the disk motor base 14. The plate spring 30 is fitted with a cam pin 29 which is held by the plate spring 30 in such a manner as to protrude forwardly from the center of the front end of the disk motor base 14.

[CONSTRUCTION OF THE CARTRIDGE HOLDER UNIT 200]

In the cartridge loading mechanism of this embodiment, the cartridge holder unit 200 into which the MO cartridge 101 (FIGS. 15 and 16) or the compatible cartridge 1 of FIG. 1 is loaded is located upwardly of the disk motor base 14.

In the cartridge holder unit 200 shown in FIGS. 2 and 4, grooves that serve as fulcrums 32 are formed in the rear end portion of a cartridge holder 31 which is fixed to the outer case 11 and used to hold the MO cartridge 101 or the compatible cartridge 1. Ring-shaped spring binders 33 are attached to the fulcrums 32 as well as to the fulcrums 27 of the disk motor base 14.

As shown in FIG. 5, the ends of each spring binder 33 are engaged in the respective fulcrums 27 and 32 in such a manner as to press them together, so that the fulcrums 32 of the cartridge holder 31 and the fulcrums 27 of the disk motor base 14 are held together in contacting relationship. The disk motor base 14 is thus allowed to turn about the fulcrums 27 and 32 and is brought into contact with or separate from the cartridge holder 31.

As shown in FIG. 2, damper fixing posts 34 are fixed to the four corners of the cartridge holder 31. The damper fixing posts 34 are fitted into the holes in vibration isolating dampers 35 mounted on the outer case 11. The cartridge holder 31 is supported in the outer case 11 via the vibration isolating dampers 35.

The cartridge holder 31 is also provided with a plurality of cartridge pressing plate springs 36. The cartridge pressing plate springs 36 work to press the MO cartridge 101 or the compatible cartridge 1, inserted in the cartridge holder 31, in the direction of the turn table 16. Further, a shutter opener support shaft 37, a clutch lever support shaft 38, and slide plate support shafts 39 are formed in protruding fashion on the cartridge holder 31.

Figure 13:
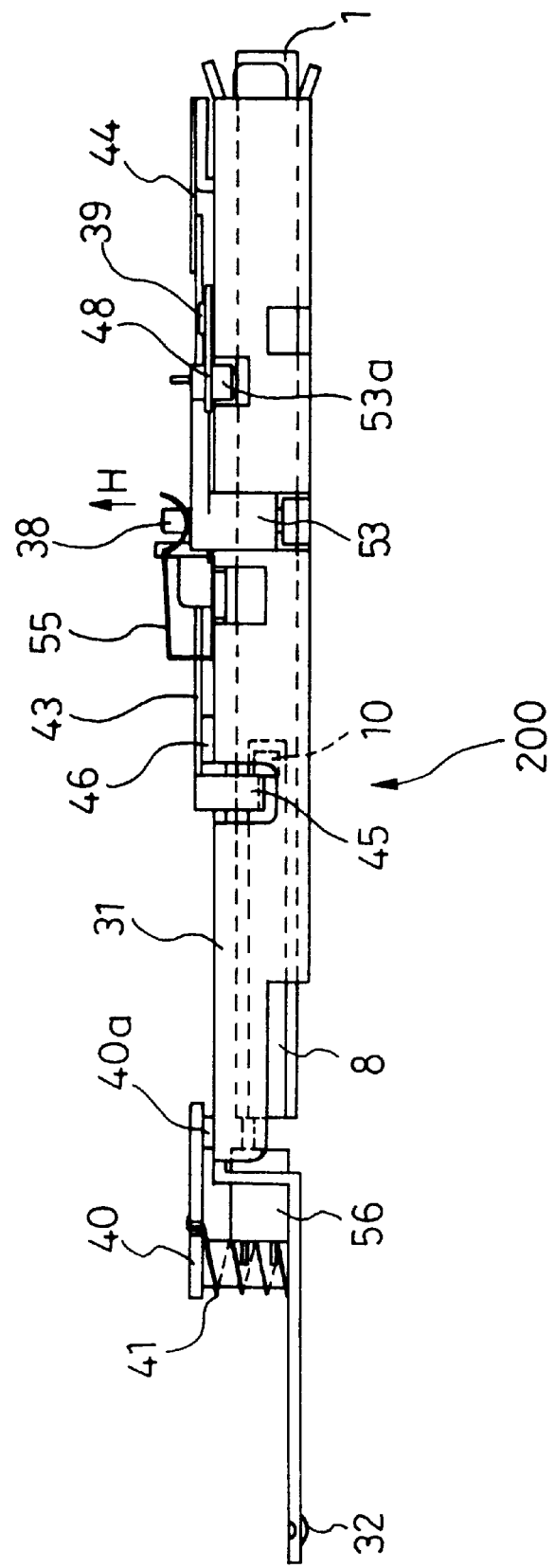
FIG. 13 is a side view showing the cartridge holder unit of FIG. 7 when a compatible cartridge is being inserted therein from the correct direction.

One end of a rod-like swingable shutter opener 40 as a first shutter opener is swingably supported on the shutter opener support shaft 37. The swingable shutter opener 40 is urged by a torsion spring 41 so as to be swung in the direction of arrow A. The other end, i.e. the free end, of the swingable shutter opener 40 is provided with an opener pin 40a protruding downward. The opener pin 40a is inserted in an arc-shaped hole 42 formed in an upper plate of the cartridge holder 31 so that, when the MO cartridge 101 shown in FIG. 13 is inserted into the cartridge holder 31, the opener pin 40a can engage on the end of the slider 103 on the inserted MO cartridge 101. The swinging motion of the opener pin 40a causes the slider 103 to slide to open the shutter 104 on the inserted MO cartridge 101.

A movable plate 43 is mounted on the cartridge holder 31 via a plate spring 44. With the plate spring 44, the movable plate 43 is urged and pressed against the upper plate of the cartridge holder 31. A side opener pawl 45 as a second shutter opener is formed at each of the free ends protruding sideways of the movable plate 43. Each side opener pawl 45 is formed in protruding fashion so that it can engage on the shutter opener hook 10 on the compatible cartridge 1 when the compatible cartridge 1 is inserted. Position limiting protrusions 46, 46 are formed at both sides of the movable plate 43. The position limiting protrusions 46, 46 are brought into contact with the upper plate of the cartridge holder 31 to determine the position of the movable plate 43 with respect to the cartridge holder 31. An opening 47 is formed in the center portion of the movable plate 43.

In FIGS. 2 and 4, the slide plate supporting shafts 39 formed in protruding fashion on the upper plate of the cartridge holder 31 support a slide plate 48 mounted on the upper plate of the cartridge holder 31. Further, the slide plate support shafts 39 are engaged in grooves formed in the slide plate 48, to guide the slide plate 48 in sliding fashion in the directions of arrows C and D. Lift slopes 49, 49 are formed at both ends of the slide plate 48. The slide plate 48 also has a stopper 50 in its center and a lever striker 51 at its left-side end.

The lift slopes 49 have the function of moving the movable plate 43 up and down by abutting against the movable plate 43 when the slide plate 48 is moved. The stopper 50 works to limit the lifting motion of the movable plate 43; in the initial condition, the movable plate 43 is engaged with the stopper 50. A tension coil spring 52 mounted on the slide plate 48 is fixed at one end to the stopper 50. The other end of the coil spring 52 is fixed to the cartridge holder 31. Accordingly, the movable plate 43 shown in FIG. 4 is urged at all times in the direction of the arrow D. The lever striker 51 formed at the left-side end of the slide plate 48 engages with a clutch lever 53 provided on the left side of the cartridge holder 31.

As shown in FIGS. 4 and 6, the clutch lever 53 provided on the left side of the cartridge holder 31 is rotatably supported on the clutch lever support shaft 38, and is rotatable about it in the directions of arrows E and F. The clutch lever 53 supported on the clutch lever support shaft 38 is also movable along it by a prescribed distance in vertical directions indicated by arrows G and H. The clutch lever 53 has an arm portion 53b extending circumferentially from its rotational axis and a free end portion 53a formed at the end of the arm portion 53b. The free end portion 53a is engaged with the lever striker 51 of the slide plate 48. The free end portion 53a is also so positioned as to contact the inserted MO cartridge 101 or compatible cartridge 1. When the arm portion 53b of the clutch lever 53 is turned in the direction of the arrow F, the arm portion 53b comes into contact with an inclined guide 54 formed on the cartridge holder 31. The arm portion 53b is moved upward when it is brought into contact with the inclined guide 54.

As shown in FIG. 6, the clutch lever 53 is pressed from two directions by means of a clutch lever pressing plate spring 55 fixed to the cartridge holder 31. The clutch lever pressing plate spring 55 comprises a first pressing plate spring 55a and a second pressing plate spring 55b. The first pressing spring 55a urges the clutch lever 53 in the direction of the arrow E. The second pressing spring 55b urges the clutch lever 53 in the downward direction indicated by the arrow G. The pressing force of each of these clutch lever pressing plate springs 55 is set weaker than the tensile force of the tension coil spring 52 urging the slide plate 48. As a result, the slide plate 48 is moved in the direction of the arrow D by the tension coil spring 52. In this way, the clutch lever 53 and the movable plate 43 are at rest in their respective initial positions shown in FIG. 7. That is, the free end portion 53a of the clutch lever 53 is arranged at a position capable of contacting an inserted cartridge, while the lift slopes 49 on the slide plate 48 are positioned so as not to contact with the movable plate 43.

As shown in FIG. 7, a detection switch 56 is mounted on the rear end side of the cartridge holder 31. The detection switch 56 is disposed in a position capable of contacting the inserted compatible cartridge 1 or MO cartridge 101. The detection switch 56 thus detects the inserted condition of each cartridge.

As shown in the top plan view of FIG. 7 showing the cartridge holder unit 200, in the initial condition the stopper 50 on the slide plate 48 is held at a position where it engages on an engaging portion 43a of the movable plate 43. On the other hand, the side opener pawls 45 are each held at a position capable of contacting the shutter opener hook 10 on the compatible cartridge 1.

[CONSTRUCTION OF THE DRIVE BASE UNIT 300]

As shown in FIGS. 2 and 4, the drive base unit 300 having a drive base 57 is fixed to the underside of the front end portion of the cartridge holder 31. A loading motor 58, a worm 59, a worm gear 60, a drive cam 61, and a cartridge engaging pawl 62 are mounted on the drive base 57.

The cartridge engaging pawl 62 is formed from an elastic resin member and is capable of engaging on the rear end of an inserted cartridge. The cartridge engaging pawl 62 has the function of holding the inserted cartridge inside the cartridge holder 31.

In the drive cam 61, a slanted cam groove 63 is formed that engages on the cam pin 29 mounted at the front of the disk motor base 14 and thereby moves the disk motor base 14 up and down. Further, an actuating pin 65 having a sloping face 65a is formed in protruding fashion on the drive cam 61. The actuating pin 65 is constructed so that it can be brought into contact with a flange 64 of the cartridge engaging pawl 62.

As shown in FIG. 4, the flange 64 of the cartridge engaging pawl 62 has a sloping face 64a at its end and is constructed so that it can be elastically deflected in the direction of arrow K (forward direction). With this construction, when the drive cam 61 is rotated in the direction of arrow I and the actuating pin 65 is brought into contact with the flange 64, the sloping face 64a of the flange 64 contacts the sloping face 65a of the actuating pin 65, which causes the flange 64 to deflect in the direction of the arrow K. On the other hand, when the drive cam 61 is rotated in the direction of arrow J and the actuating pin 65 is brought into contact with the flange 64, the actuating pin 65 engages with a recessed portion 64b formed in the upper face of the flange 64. Therefore, as the actuating pin 65 is turned in the direction of the arrow J, the actuating pin 65 moves by pushing down the upper face of the flange 64, thus deflecting the cartridge engaging pawl 62 in the downward direction.

In this way, the cartridge engaging pawl 62 is pushed downward only when the actuating pin 65 is rotated in the direction of the arrow J and brought into contact with it. When the actuating pin 65 is rotated in the direction of the arrow I and brought into contact with it, the flange 64 is deflected in the direction of the arrow K but the cartridge engaging pawl 62 does not move downward

[COMPATIBLE LOADING OPERATION IN THE CARTRIDGE LOADING MECHANISM]

Figure 15:
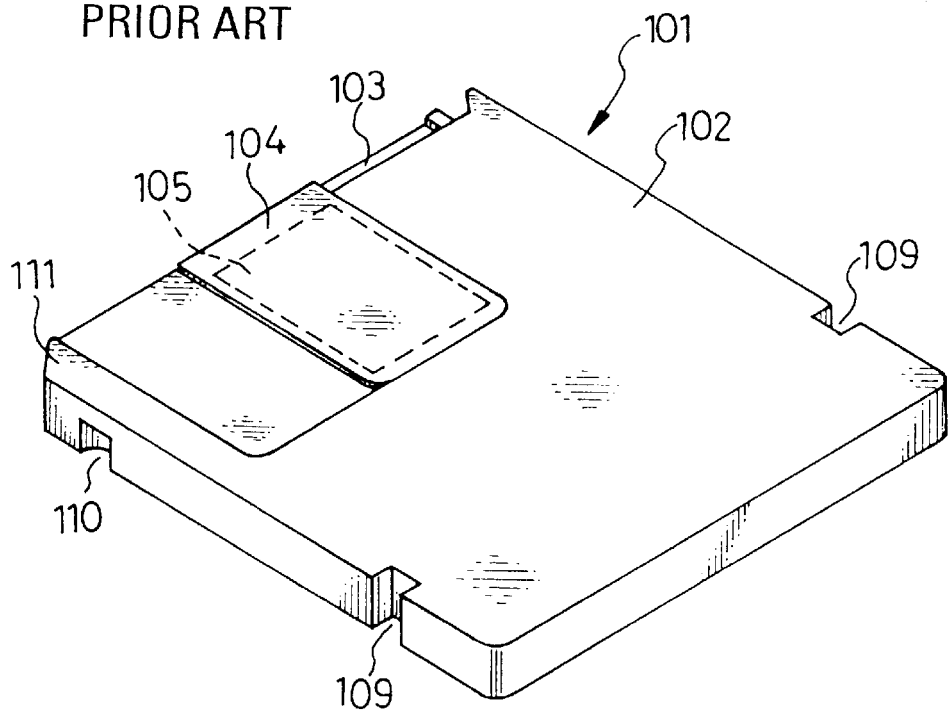
FIG. 15 is an external perspective view showing the MO cartridge as viewed from the front.
Figure 16:
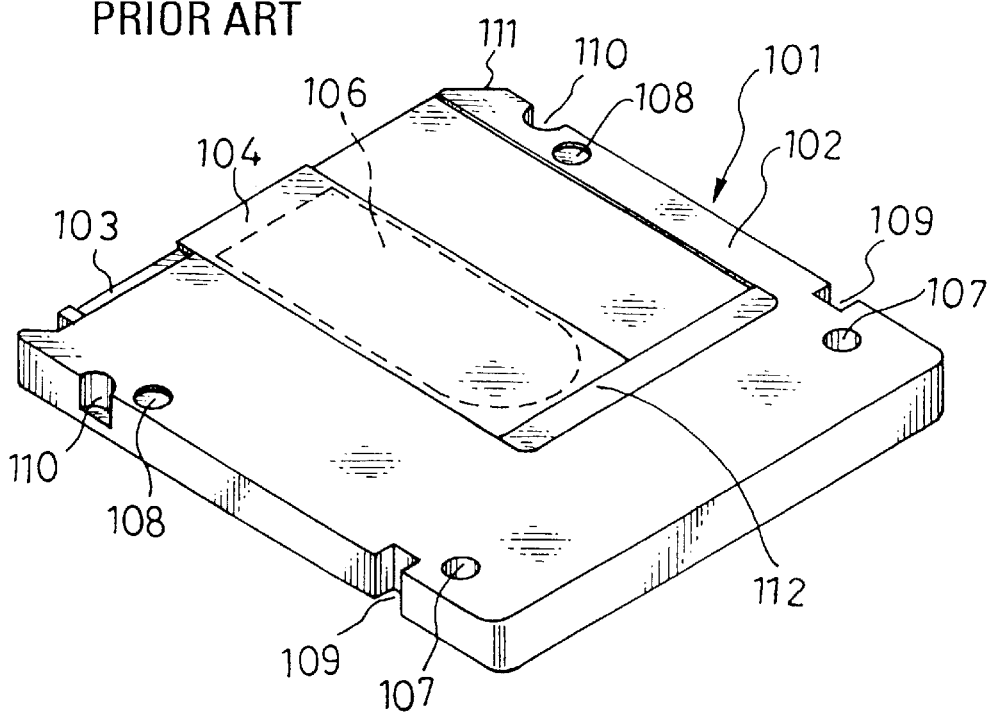
FIG. 16 is an external perspective view showing the MO cartridge as viewed from the back.
Figure 17:
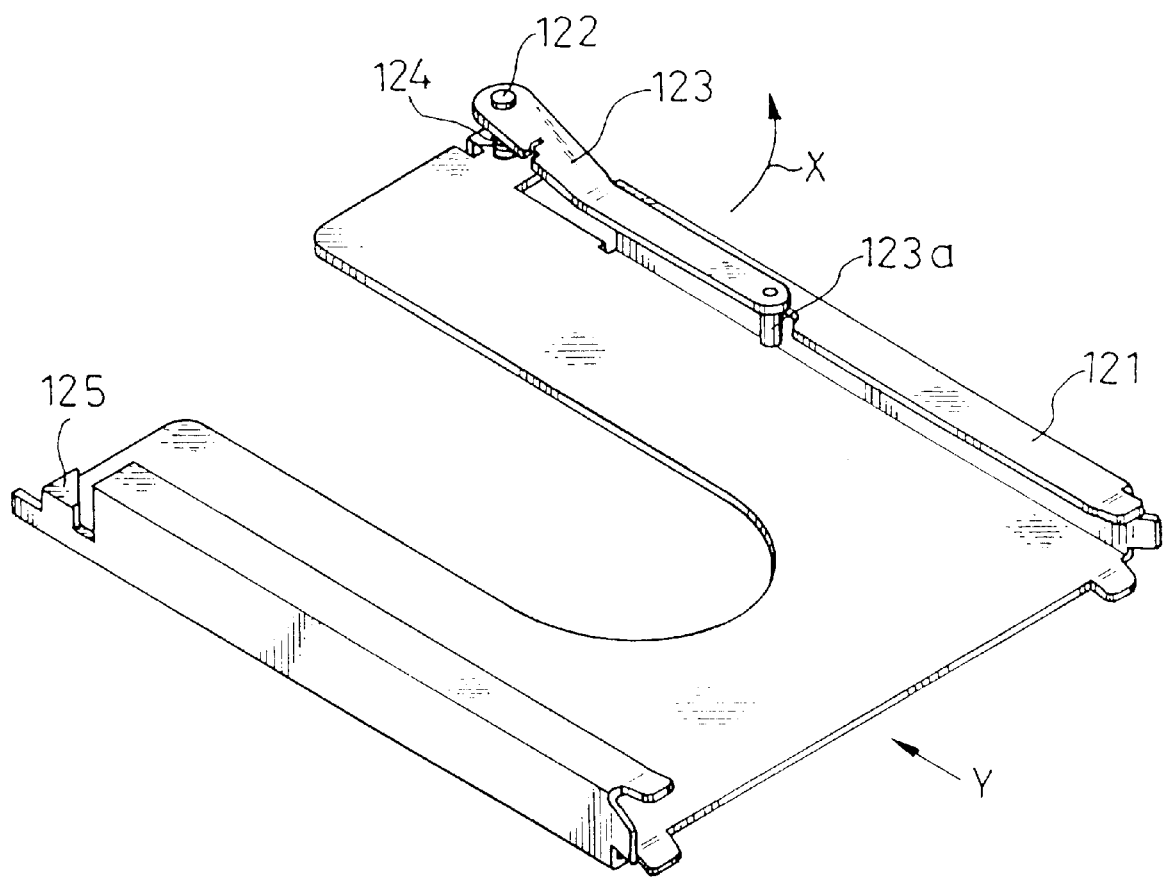
FIG. 17 is an external perspective view showing a prior art MO cartridge loading mechanism.

Next, we will describe the compatible loading operation of the MO cartridge 101 shown in FIGS. 15 and 16 and the compatible cartridge 1 shown in FIG. 1 in the thus constructed cartridge loading mechanism of this embodiment.

[1.1 NORMAL INSERTION OPERATION OF THE MO CARTRIDGE 101]

First, a description will be given of the operation when the MO cartridge 101 is inserted into the cartridge loading mechanism of this embodiment from the correct direction.

Referring to FIG. 5 showing a cross-sectional view in side elevation of the compatible loading apparatus 600, the MO cartridge 101 is inserted into the apparatus through the cartridge insertion slot 12a in the front panel 12 by pushing up the open/close lid 13. At this time, the case body 102 of the MO cartridge 101 pushes down the cartridge engaging pawl 62, and the MO cartridge 101 is inserted into the cartridge holder unit 200 with the cartridge engaging pawl 62 contacting the lower surface of the case body 102.

Figure 8:
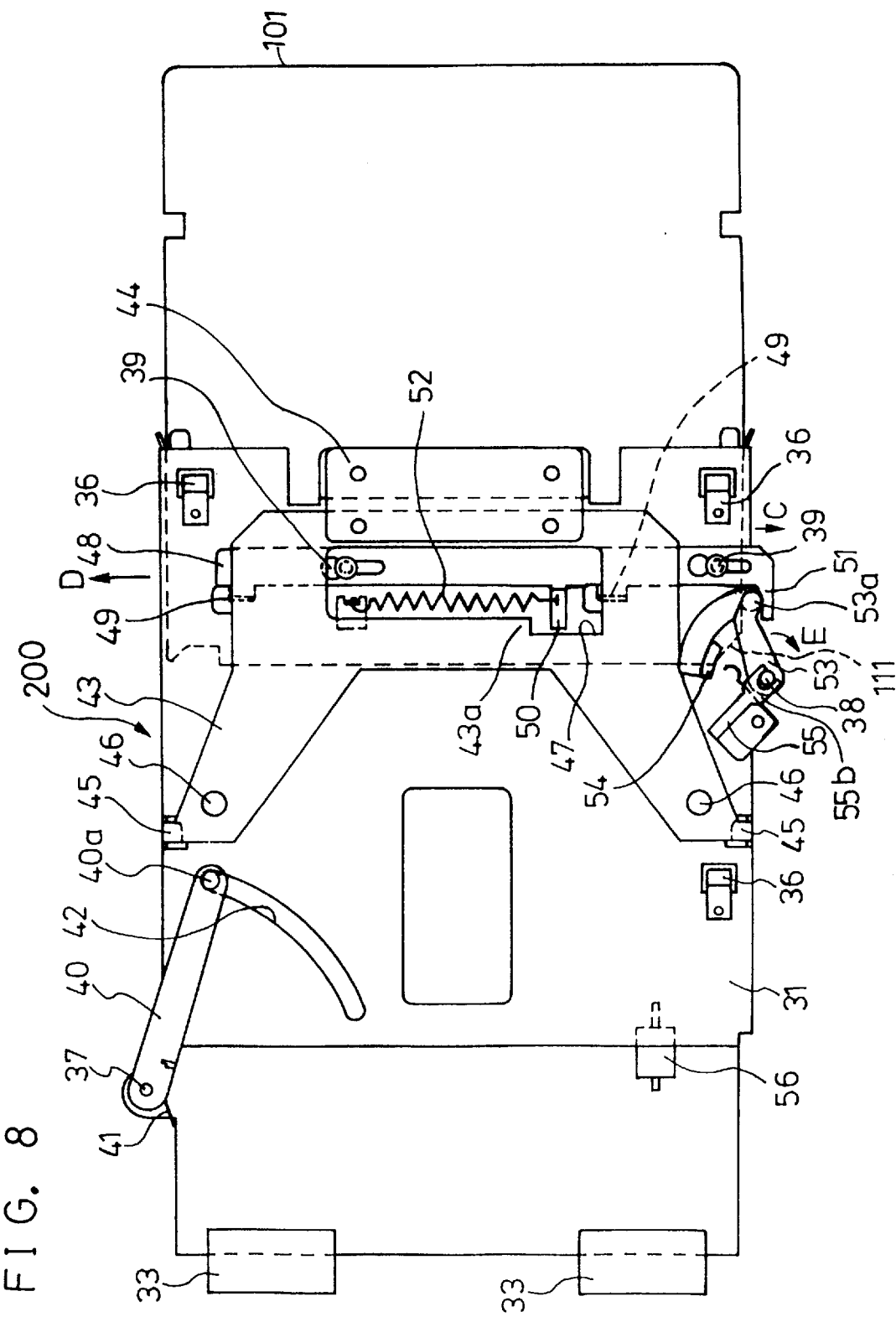
FIG. 8 is a top plan view showing the cartridge holder unit of FIG. 7 when an MO cartridge is being inserted therein from the correct direction.
Figure 9:
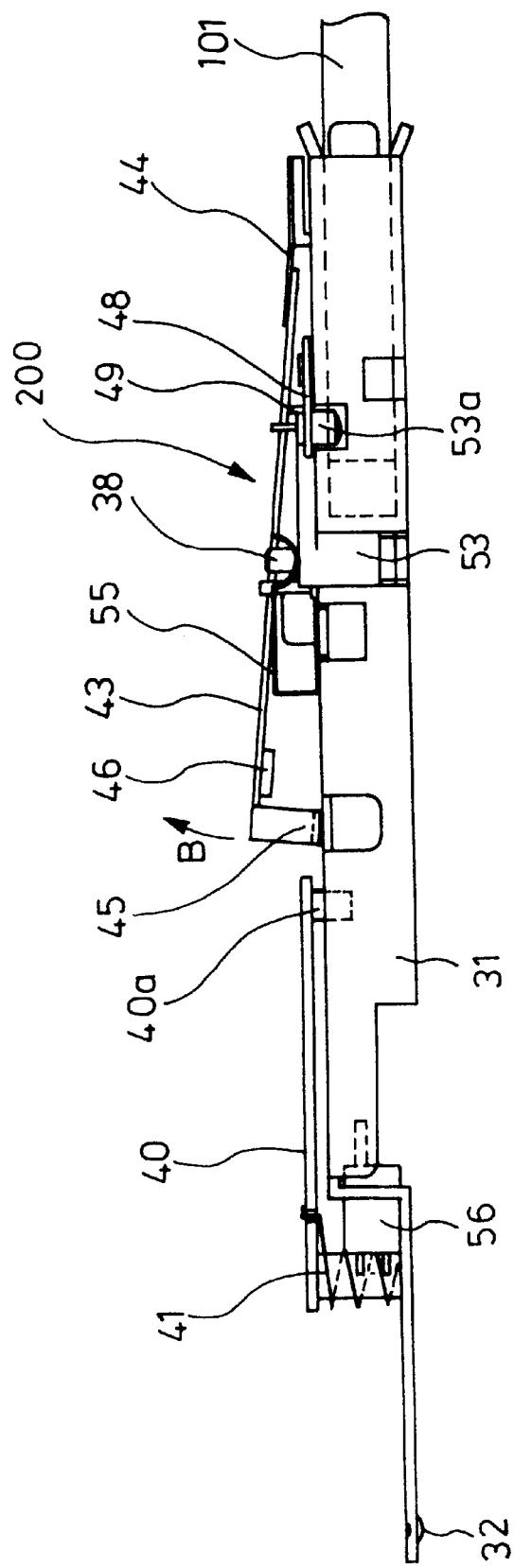
FIG. 9 is a side view showing the cartridge holder unit of FIG. 7 when the MO cartridge is being inserted therein from the correct direction.
Figure 10:
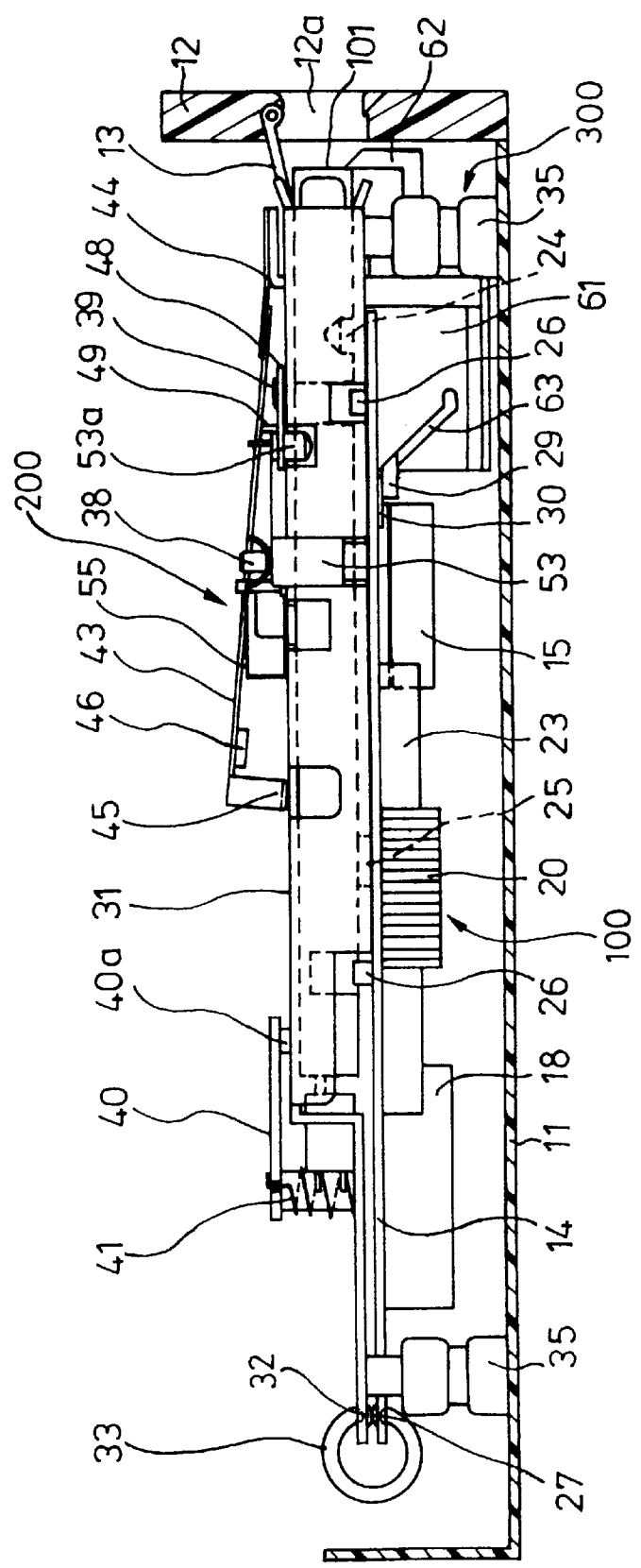
FIG. 10 is a cross-sectional view in side elevation, showing the compatible loading apparatus when the MO cartridge has been loaded completely.

FIG. 8 is a top plan view showing the cartridge holder unit 200 in a condition in which the MO cartridge 101 of FIG. 8 is being inserted into the cartridge holder unit 200 of the cartridge loading mechanism from the correct direction, and FIG. 9 is a side view showing the cartridge holder unit 200 in the condition of FIG. 8. FIG. 10 is a cross-sectional view in side elevation, showing the compatible loading apparatus when the MO cartridge 101 has been completely loaded into the cartridge holder unit 200.

When the MO cartridge 101 is inserted into the cartridge holder 31 of the cartridge holder unit 200, the corner notch 111 on the case body 102 hits the free end portion 53a of the clutch lever 53 held in its initial position. The corner notch 111 is cut at an angle of about 45 degrees. Accordingly, the inserting force of the MO cartridge 101 causes the free end portion 53a of the clutch lever 53 to slide along the corner notch 111, thereby rotating the clutch lever 53 in the direction of the arrow E. As a result, the lever striker 51 of the slide plate 48, on which the free end portion 53a of the clutch lever 53 is engaged, is moved in the direction of the arrow C against the urging force of the tension coil spring 52. With the movement of the slide plate 48 in the direction of the arrow C, the stopper 50 on the slide plate 48 is disengaged from the engaging portion 43a of the movable plate 43 and moves inside the opening 47, thus putting the movable plate 43 in an upwardly movable condition.

As the slide plate 43 is further moved in the direction of the arrow C, the lift slopes 49 formed on the slide plate 43 are brought into contact with the movable plate 43 which is thus lifted upward against the urging force of the plate spring 44 with the connecting portion with the plate spring 44 working as the fulcrum.

Eventually, the free end portion 53a of the clutch lever 53 is disengaged from the corner notch 111 of the MO cartridge 101 and comes into contact with the side face of the MO cartridge 101. The free end portion 53a then slides along the side face of the MO cartridge 101. The movable plate 43 is thus held in the upwardly lifted position.

As a result, the side opener pawls 45 of the movable plate 43 are positioned outside the insertion path of the MO cartridge 101, and held in an upward position to avoid contact with the MO cartridge 101. The MO cartridge 101 is thus allowed to be inserted further into the cartridge holder unit 200.

As described above, when the MO cartridge 101 is inserted into the cartridge holder unit 200, the movable plate 43 is lifted upward. Further, the opener pin 40a on the swingable shutter opener 40 hits the end portion of the slider 103 on the MO cartridge 101 and, with the inserting force of the MO cartridge 101, moves the slider 103 along the front end face of the case body 102. In this way, the shutter 104 connected to the slider 103 is opened.

When the MO cartridge 101 is further inserted until reaching a position where the second opening 106 is completely exposed, the front end portion of the case body 102 of the MO cartridge 101 contacts the detection switch 56 disposed at the rear end of the cartridge holder unit 200. On the other hand, the cartridge engaging pawl 62 disposed at the front of the cartridge holder unit 200 is disengaged from the lower surface of the case body 102 and engages on the rear end of the case body 102 by its own resilient force. In this way, the insertion operation complete condition of the MO cartridge 101 inserted in the cartridge holder 31 is reliably detected, and the MO cartridge 101 is securely held in the correct position inside the cartridge holder unit 200.

[1.2 LOADING OPERATION OF THE MO CARTRIDGE 101]

Next, we will describe the loading operation of the MO cartridge 101 inserted in the cartridge holder unit 200.

The detection switch 56 contacted with the MO cartridge 101 outputs an insertion operation complete signal, based on which the loading motor 58 rotates the drive cam 61 in the direction of the arrow I via the worm 59 and worm gear 60 (see FIG. 4). With the rotation of the drive cam 61 in the direction of the arrow I, the actuating pin 65 provided on the drive cam 61 comes into contact with the flange 64 of the cartridge engaging pawl 62. At this time, however, the cartridge engaging pawl 62 does not deflect downward and is therefore held in a condition engaging on the MO cartridge 101.

When the drive cam 61 is further rotated in the direction of the arrow I, the cam pin 29, mounted on the disk motor base 14 and engaged in the cam groove 63 formed in the drive cam 61, is moved upward following the slanted shape of the cam groove 63. This causes the disk motor base 14 to turn upward about the fulcrum 27 provided at its rear end. At this time, the position limiting protrusions 28 provided on the disk motor base 14 are brought into contact with the cartridge holder 31, and the disk motor base 14 is held in the prescribed position with respect to the cartridge holder 31.

After the position limiting protrusions 28 on the disk motor base 14 are brought into contact with the cartridge holder 31, the cam pin 29 provided on the disk motor base 14 continues to move upward along the cam groove 63 in the drive cam 61. As a result, the disk motor base 14 is held in position by being pressed against the cartridge holder 31 with a prescribed pressure being exerted by the resilient force of the plate spring 30.

During the process of the above loading operation, the moving carriage 21 of the optical pickup 17 and the turn table 16 of the disk motor 15, which are mounted on the disk motor base 14, are inserted through the second opening 106 formed on the reverse side of the case body 102 and are thus positioned inside the MO cartridge 101. At this time, the positioning pins 24 provided on the disk motor base 14 are inserted in the positioning holes 107 formed in the MO cartridge 101. Further, the first reference posts 25 provided on the disk motor base 14 are in contact with the reference faces 108 on the MO cartridge 101, while the second reference posts 26 are inserted in the slots 109 and recesses 110.

At this time, the upper surface of the case body 102 of the MO cartridge 101 is pressed by the cartridge pressing plate springs 36 provided on the cartridge holder 31, and thus the case body 102 of the MO cartridge 101 is securely held in position by the first reference posts 25 and the positioning pins 24. As a result, the magneto-optical disk contained in the MO cartridge 101 is mounted on the turn table 16, completing the loading operation of the MO cartridge 101 as shown in FIG. 10.

After completing the loading operation as shown in FIG. 10, the disk motor 15 is driven to rotate the MO disk, a current is fed to the linear motor coils to move the moving carriage 21 to a prescribed position on the MO disk, and information recording or reproducing is performed using a light beam focused through the objective lens 19 of the optical pickup 17.

As described above, when the MO cartridge 101 is correctly inserted, the side opener pawls 45 of the movable plate 43 are moved upward away from the insertion path of the MO cartridge 101, allowing the MO cartridge 101 to be inserted further. Further, since the first reference posts 25 are held in contact with the reference faces 8 on the case body 102, with the second reference posts 26 inserted in the slots 109 and recesses 110 in noncontacting fashion with the case body 102, the MO cartridge is securely held in the prescribed disk mounting position.

[1.3 EJECTION OPERATION OF THE MO CARTRIDGE 101]

Next, we will describe the ejection operation of the MO cartridge 101 in the cartridge loading mechanism of this embodiment.

When the eject button 12b (FIG. 2) on the front panel 12 is pressed, the optical pickup 17 stops emitting the light beam and the rotation of the disk motor 15 also stops. At this time, the loading motor 58 rotates in the reverse direction to the direction when the MO cartridge 101 was inserted, and rotates the drive cam 61 in the direction of the arrow J. This initiates the following ejection operation which is the reverse of the insertion and loading operation of the MO cartridge 101.

The disk motor base 14 is turned downward and disengaged from the MO cartridge 101. The actuating pin 65 on the drive cam 61 comes into contact with the flange 64 of the cartridge engaging pawl 62, and the drive cam 61 pushes down the cartridge engaging pawl 62. As a result, the MO cartridge 101 held inside the cartridge holder 31 is allowed to be ejected.

That is, the MO cartridge 101 held inside the cartridge holder 31 is ejected outside the apparatus through the cartridge insertion slot 12a in the front panel by the action of the torsion spring provided within the case body 102 to urge the shutter 104 and the torsion spring 41 provided to urge the shutter opener 40, both springs exerting an urging force in the direction of ejection.

[1.4 ABNORMAL INSERTION OPERATION OF MO CARTRIDGE 101]

Next, we will describe the operation when the MO cartridge 101 is inserted into the cartridge loading mechanism of this embodiment from an incorrect direction.

Figure 11:
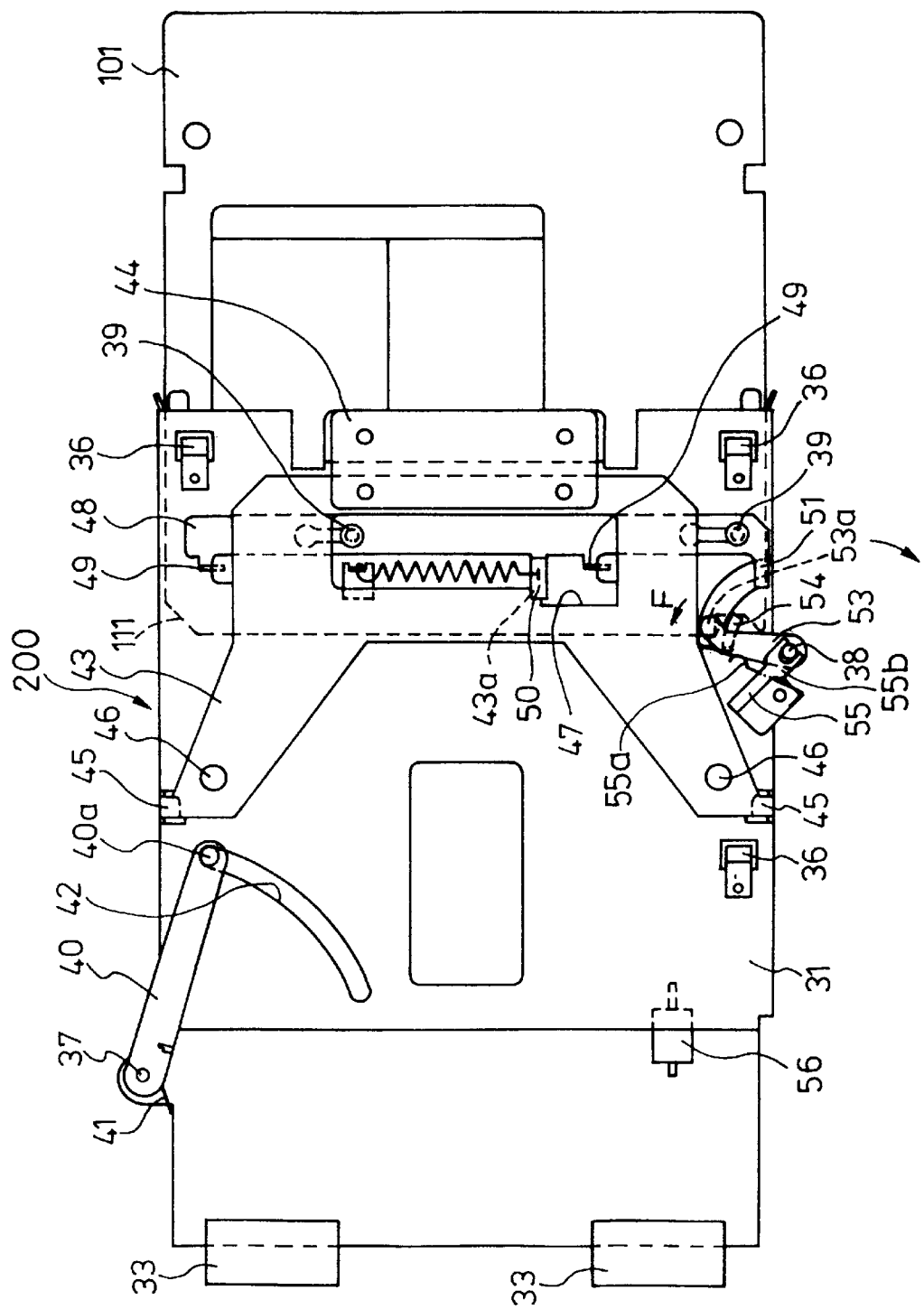
FIG. 11 is a top plan view showing the cartridge holder unit of FIG. 7 when the MO cartridge is being inserted from an incorrect direction.
Figure 12:
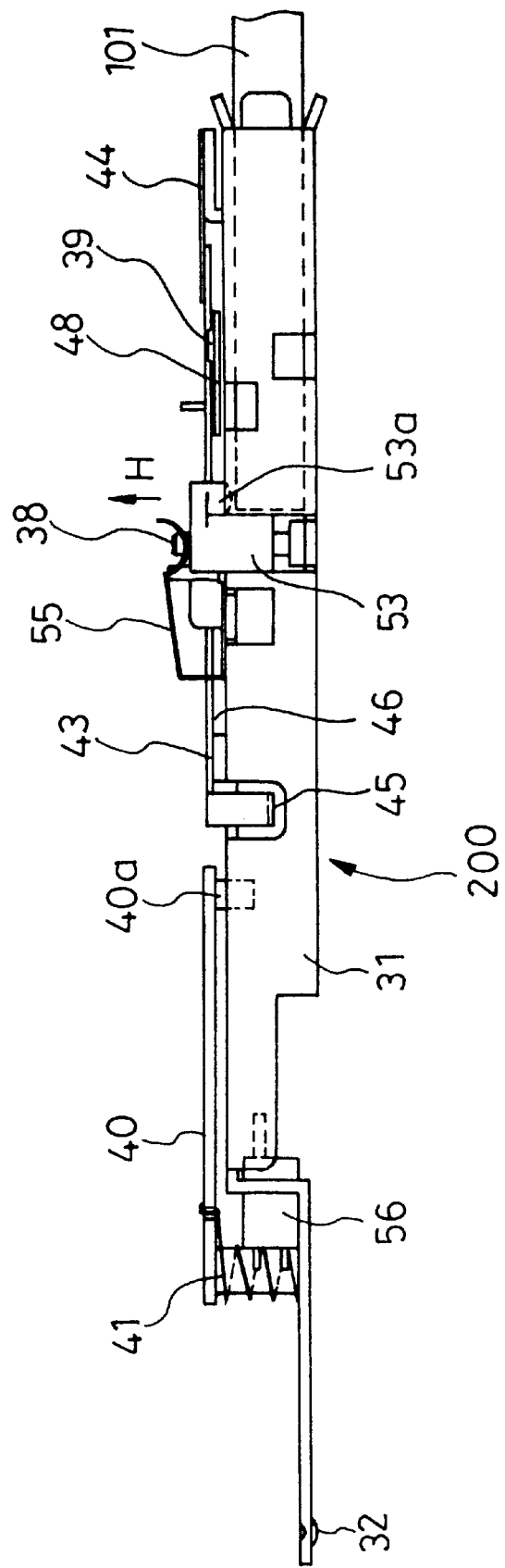
FIG. 12 is a side view showing the cartridge holder unit of FIG. 7 when the MO cartridge is being inserted from the incorrect direction.

FIG. 11 is a top plan view showing the cartridge holder unit 200 in a condition in which the MO cartridge 101 is being inserted from an incorrect direction, and FIG. 12 is a side view showing the cartridge holder unit 200 in the condition of FIG. 11. To avoid repeating the same explanation as already given in connection with the normal insertion operation of the MO cartridge 101, only differences of the abnormal insertion operation from the normal insertion operation will be described below.

When the MO cartridge 101 is inserted upside down into the cartridge holder unit 200, as shown in FIG. 11, a front end portion of the case body 102 strikes against the free end portion 53a of the clutch lever 53. Since the corner notch 111 is not formed in this front end portion, the clutch lever 53 is turned in the direction of the arrow F by the inserting force of the MO cartridge 101. At this time, the arm portion 53b of the clutch lever 53 moves along the inclined guide 54. This causes the clutch lever 53 to be lifted upward, as shown in FIG. 12. As a result, when the MO cartridge 101 is further inserted, the upward lifting motion of the clutch lever 53 causes the free end portion 53a of the clutch lever 53 to move upward away from the front end portion of the case body 102 and slide over the upper surface of the case body 102. At this time, the free end portion 53a is pressed against the upper surface of the case body 102 by the urging force of the second pressing plate spring 55b of the clutch lever pressing plate spring 55. Further, since the clutch lever 53 is urged by the first pressing plate spring 55a in such a manner as to turn in the direction of the arrow E, the free end portion 53a of the clutch lever 53, while being slightly lifted up, returns to the position where it contacts the lever striker 51 of the slide plate 48.

When the MO cartridge 101 is inserted partway into the cartridge holder unit 200, as described above, since the movable plate 43 is not moved upward, the MO cartridge 101 strikes against the side opener pawls 45 and is prevented from being inserted further. At this time, the movable plate 43 is engaged with the stopper 50 on the slide plate 48 and locked in that position; therefore, if it is attempted to forcibly insert the MO cartridge 101, the movable plate 43 remains locked in that position against the inserting force, thus reliably preventing the abnormal insertion operation of the MO cartridge 101.

When the MO cartridge 101 is inserted backwards, the same abnormal insertion operation as described above is performed, and such incorrect insertion can also be prevented completely.

As described above, in the cartridge loading mechanism of this embodiment, when the MO cartridge 101 is inserted from the wrong direction, the side opener pawls 45 formed on both sides of the movable plate 43 serve the function of preventing incorrect insertion and thus prevent an abnormal operation of the apparatus.

Furthermore, in the cartridge loading mechanism of this embodiment, the free end portion 53a can be moved outside the insertion path of the MO cartridge 101 with a small amount of rotation of the clutch lever 53. As a result, in the cartridge loading mechanism of this embodiment, the deflection of the clutch lever pressing plate spring 55 is kept minimum under abnormal conditions and excessive strain is not applied to the clutch lever pressing plate spring 55. Thus this embodiment achieves a highly reliable, long-life cartridge loading mechanism.

[2.1 NORMAL INSERTION OPERATION OF THE COMPATIBLE CARTRIDGE 1]

Next, we will describe the operation when the compatible cartridge 1 as the double-sided cartridge shown in FIG. 1 is inserted into the cartridge loading mechanism of this embodiment from the correct direction.

Figure 14:
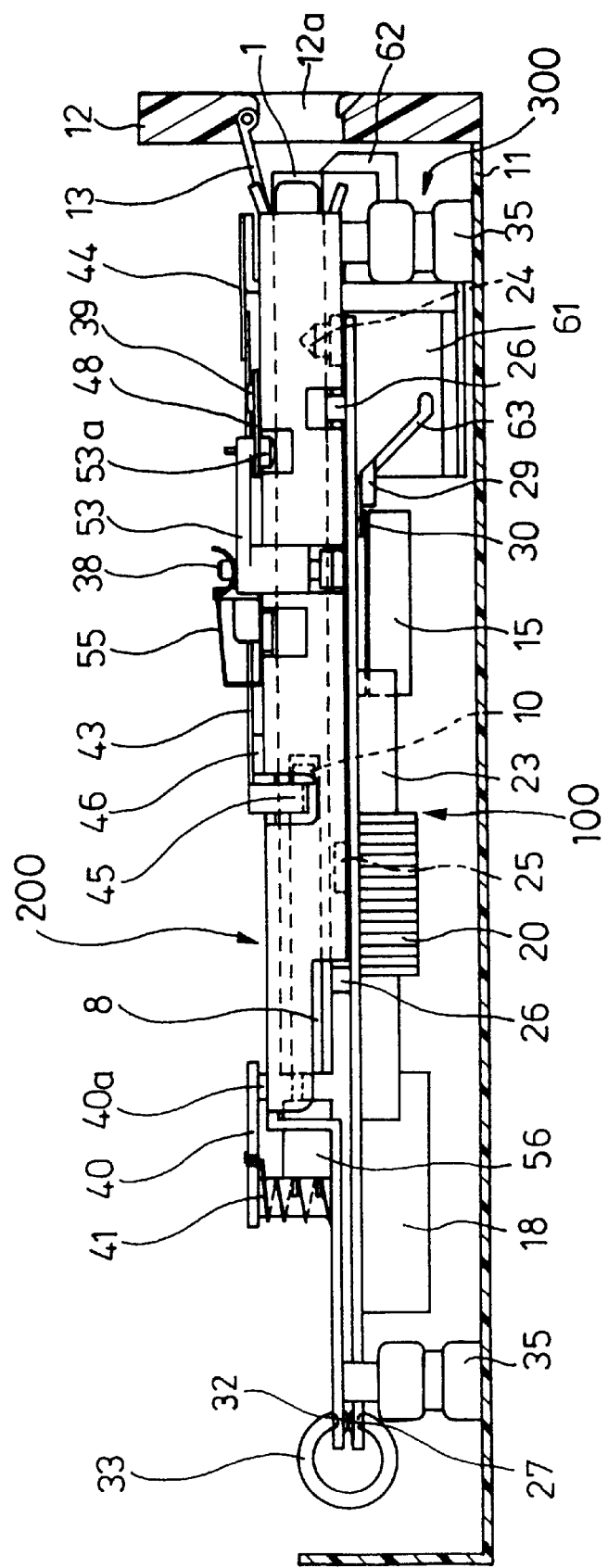
FIG. 14 is a cross-sectional view in side elevation, showing the compatible loading apparatus of FIG. 2 when the compatible cartridge has been loaded completely.

FIG. 13 is a side view showing a condition in which the compatible cartridge 1 is inserted in the cartridge holder unit 200 from the correct direction. FIG. 14 is a cross-sectional view in side elevation, showing the compatible loading apparatus in the condition in which the loading operation of the inserted compatible cartridge 1 is completed.

Since the compatible cartridge 1 is not provided with a corner notch, its insertion operation is the same as the insertion operation when the MO cartridge 101 is inserted from the wrong direction. More specifically, the operation up to the point where the MO cartridge 101 hits the side opener pawls 45 of the movable plate 43 is the same as the normal insertion operation of the compatible cartridge 1. To avoid repeating the same explanation, only the normal insertion operation of the compatible cartridge 1 after that point will be described below.

When the compatible cartridge 1 inserted into the cartridge holder 31 reaches the position of the side opener pawls 45 of the movable plate 43, the side opener pawls 45 enter the grooves 8 formed in both sides faces of the case body 2, and either one of the side opener pawls 45 strikes the shutter opener hook 10 provided in one of the grooves 8. As the compatible cartridge 1 is further inserted, the side opener pawl 45 engages with the shutter opener hook 10 and moves it against the force of the torsion spring installed inside the case body 2. This causes the opener belt 9 attached to the shutter opener hook 10 to move sliding along the groove 8, thus opening the shutter 3.

During the process of the shutter opening operation, the opener pin 40a of the swingable shutter opener 40 provided on the cartridge holder 31 strikes the front end face of the case body 2 and swings (in the direction of the arrow L in FIG. 4) while sliding along the front end face.

When the compatible cartridge 1 is further inserted until reaching a position where the opening 4 is completely exposed, the front end face of the case body 2 contacts the detection switch 56. On the other hand, the cartridge engaging pawl 62 disposed near the front end of the compatible loading apparatus 600 is disengaged from the lower surface of the case body 2 and engages on the rear end of the case body 2 by its own resilient force. Therefore, the compatible cartridge 1 inserted in the compatible loading apparatus 600 is securely positioned and held inside the cartridge holder 31.

[2.2 LOADING OPERATION OF THE COMPATIBLE CARTRIDGE 1]

The loading operation of the compatible cartridge 1 is essentially the same as the loading operation of the MO cartridge 101 already described. That is, the disk motor base 14 is turned upward with the rotation of the loading motor 58, and the disk motor base 14 is held in the prescribed position with respect to the cartridge holder 31.

As a result, the moving carriage 21 of the optical pickup 17 and the turn table 16 of the disk motor 15 are inserted through the opening 4 and thus positioned inside the compatible cartridge 1. At this time, the positioning pins 24 provided on the disk motor base 14 are inserted in the positioning holes 5, while the second reference posts 26 are held in contact with the second reference faces 7. Also at this time, the upper surface of the case body 2 of the compatible cartridge 1 is pressed downward by the cartridge pressing plate springs 36 provided on the cartridge holder 31.

As described above, the second reference faces 7 on the case body 2 are supported on the second reference posts 26 which are 0.5 mm higher than the first reference posts 25 used to support the MO cartridge 101. Accordingly, the optical disk contained inside the case body 2 is mounted in the correct position on the turn table 16. When the compatible cartridge 1 is thus positioned with the optical pickup 17, etc. inserted as described above, the loading operation of the compatible cartridge 1 is complete.

At this time, since the optical disk is held centered inside the case body 2, the optical disk does not touch the case body 2.

Next, we will describe the operation when the compatible cartridge 1 is inserted upside down into the cartridge holder unit 200.

The compatible cartridge 1 has grooves 8 formed in both side faces of the case body 2. When the compatible cartridge 1 is inserted upside down, the side opener pawls 45 of the movable plate 43 enter the grooves 8 and do not touch the case body 2. As a result, either one of the side opener pawls 45 strikes the shutter opener hook 10 in one of the grooves 8, and the same insertion operation as the earlier described normal insertion operation is performed. Though the opener pin 40a of the swingable shutter opener 40 comes into contact with the shutter 3 as the shutter 3 is moved to open, this does not present a problem in the shutter opening operation.

As described above, in the cartridge loading mechanism of this embodiment, the cartridge holder unit 200 is provided with the first reference posts 25 for the MO cartridge 101 and the second reference posts 26 for the compatible cartridge 1, and when the compatible cartridge 1 having the second reference faces 7 shown in FIG. 1 is used, the cartridge holder unit 200 thus constructed accommodates the difference in disk mounting position between the compatible cartridge 1 and the MO cartridge 101 and thus allows the compatible loading operation.

When the compatible cartridge 1 is inserted backwards into the cartridge holder 31, the side opener pawls 45 of the movable plate 43 strike against the corners of the rear end portion of the case body 2 and prevent further insertion, thus accomplishing the prevention of incorrect insertion.

The description of the above embodiment has dealt with the cartridge loading mechanism capable of interchangeably loading two kinds of cartridges having different shutter opening directions and different disk mounting positions, and with the compatible cartridge for use with the same. However, if the two kinds of cartridges are the same in disk mounting position but different only in shutter opening direction, the second reference posts 26 need not be provided on the cartridge loading mechanism.

Also, the above embodiment has employed a mechanism in which the side opener pawls 45 as the second shutter openers are positioned in the cartridge insertion path in the initial condition, and are moved outside the cartridge insertion path as the clutch lever 53 moves by contacting the corner notch provided on a single-sided cartridge. However, the present invention is not limited to the above mechanism; for example, if the mechanism is constructed such that the side opener pawls are positioned outside the cartridge insertion path in the initial condition, and are moved into the cartridge insertion path as the clutch lever moves by contacting a corner other than the corner notch, the same effects as achieved with the above embodiment can be obtained.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. A compatible cartridge for use in a first disk reproducing apparatus having a mounting disk distance and in a second disk reproducing apparatus having a mounting disk distance differing from that of said first disk reproducing apparatus, said compatible cartridge comprising:

a case body encasing a readable and writable disk and shaped in the form of a substantially rectangular housing, said case body having an opening formed therein; and a shutter for opening and closing said opening of said case body, and wherein said case body has positioning holes for positioning said compatible cartridge at a predetermined position in either of said first and second disk reproducing apparatuses by engaging a positioning pin provided in either of said first and second disk reproducing apparatuses, first reference faces for holding said compatible cartridge at said predetermined position by contacting with first reference posts provided in said second disk reproducing apparatus, a first pair of second reference faces for interfacing said compatible cartridge with an autochanger in either of said first and second disk reproducing apparatuses, and a second pair of second reference faces for interfacing said compatible cartridge with an autoloader in said first disk reproducing apparatus, said first and second pair of second reference faces arranged to be flush with said first reference faces, said compatible cartridge being arranged such that, when installed in said first disk reading apparatus, said readable and writable disk is positioned at a predetermined disk mounting position which is the same as the position at which the readable and writable disk is positioned when installed in said second disk reproducing apparatus.

\* \* \* \* \*